United States Patent
Noursalehi et al.

(10) Patent No.: US 11,526,653 B1
(45) Date of Patent: *Dec. 13, 2022

(54) SYSTEM AND METHOD FOR OPTIMIZING ELECTRONIC DOCUMENT LAYOUTS

(71) Applicant: Overstock.com, Inc., Midvale, UT (US)

(72) Inventors: Sam Noursalehi, Salt Lake City, UT (US); Yugang Hu, Salt Lake City, UT (US); Allen Joel Dickson, Eldersburg, MD (US)

(73) Assignee: Overstock.com, Inc., Midvale, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/223,246

(22) Filed: Apr. 6, 2021

Related U.S. Application Data

(63) Continuation of application No. 16/669,971, filed on Oct. 31, 2019, now Pat. No. 10,970,463, which is a
(Continued)

(51) Int. Cl.
  *G06F 40/00* (2020.01)
  *G06F 40/106* (2020.01)
  (Continued)

(52) U.S. Cl.
  CPC ............ *G06F 40/106* (2020.01); *G06F 16/93* (2019.01); *G06N 7/005* (2013.01); *G06N 20/00* (2019.01)

(58) Field of Classification Search
  CPC ................. G06F 17/211; G06F 17/212; G06F 17/30867; G06F 40/106; G06F 16/93; G06N 20/00
  See application file for complete search history.

(56) References Cited

U.S. PATENT DOCUMENTS

| | | | |
|---|---|---|---|
| 3,573,747 A | 4/1971 | Adams et al. | |
| 3,581,072 A | 5/1971 | Nymeyer | |

(Continued)

FOREIGN PATENT DOCUMENTS

| | | |
|---|---|---|
| CA | 2253543 | 3/1997 |
| CA | 2347812 | 5/2000 |

(Continued)

OTHER PUBLICATIONS

Teo, "Organizational Factors of Success in Using EDIS: A Survey of Tradenet Participants," Electronic Markets—The International Journal, Oct. 1993, 2 pages, vol. 3, No. 3.

(Continued)

*Primary Examiner* — Scott T Baderman
*Assistant Examiner* — Barbara M Level
(74) *Attorney, Agent, or Firm* — Clayton Howarth, P.C.

(57) ABSTRACT

A system and method is provided that ranks and sorts websites, apps, email, or VR environment content in real-time to increase engagement, CTR, conversions, and revenue. A client applies attributes to sections of the digital content. A server system tracks end user inputs and generates optimized layouts for the digital content, such as a webpage. The document layout is ordered or reorganized before or after the document is delivered to the end user.

18 Claims, 8 Drawing Sheets

Related U.S. Application Data continuation of application No. 15/593,040, filed on May 11, 2017, now Pat. No. 10,534,845.

(60) Provisional application No. 62/335,050, filed on May 11, 2016.

(51) Int. Cl.
*G06N 20/00* (2019.01)
*G06F 16/93* (2019.01)
*G06N 7/00* (2006.01)

(56) References Cited

U.S. PATENT DOCUMENTS

| | | |
|---|---|---|
| 4,412,287 A | 10/1983 | Braddock, III |
| 4,674,044 A | 6/1987 | Kalmus et al. |
| 4,677,552 A | 6/1987 | Sibley, Jr. |
| 4,789,928 A | 12/1988 | Fujisaki |
| 4,799,156 A | 1/1989 | Shavit et al. |
| 4,808,987 A | 2/1989 | Takeda et al. |
| 4,823,265 A | 4/1989 | Nelson |
| 4,854,516 A | 8/1989 | Yamada |
| 4,903,201 A | 2/1990 | Wagner |
| RE33,316 E | 8/1990 | Katsuta et al. |
| 5,027,110 A | 6/1991 | Chang et al. |
| 5,053,956 A | 10/1991 | Donald et al. |
| 5,063,507 A | 11/1991 | Lindsey et al. |
| 5,077,665 A | 12/1991 | Silverman et al. |
| 5,101,353 A | 3/1992 | Lupien et al. |
| 5,136,501 A | 8/1992 | Silverman et al. |
| 5,168,446 A | 12/1992 | Wiseman |
| 5,205,200 A | 4/1993 | Wright |
| 5,243,515 A | 9/1993 | Lee |
| 5,258,908 A | 11/1993 | Hartheimer et al. |
| 5,280,422 A | 1/1994 | Moe et al. |
| 5,297,031 A | 3/1994 | Gutterman et al. |
| 5,297,032 A | 3/1994 | Trojan et al. |
| 5,301,350 A | 4/1994 | Rogan et al. |
| 5,305,200 A | 4/1994 | Hartheimer et al. |
| 5,325,297 A | 6/1994 | Bird et al. |
| 5,329,589 A | 7/1994 | Fraser et al. |
| 5,347,632 A | 9/1994 | Filepp et al. |
| 5,375,055 A | 12/1994 | Togher et al. |
| 5,377,354 A | 12/1994 | Scannell et al. |
| 5,394,324 A | 2/1995 | Clearwater |
| 5,407,433 A | 4/1995 | Loomas |
| 5,411,483 A | 5/1995 | Loomas et al. |
| 5,426,281 A | 6/1995 | Abecassis |
| 5,485,510 A | 1/1996 | Colbert |
| 5,493,677 A | 2/1996 | Balogh et al. |
| 5,553,145 A | 9/1996 | Micali |
| 5,557,728 A | 9/1996 | Garrett et al. |
| 5,579,471 A | 11/1996 | Barber et al. |
| 5,596,994 A | 1/1997 | Bro |
| 5,598,557 A | 1/1997 | Doner et al. |
| 5,621,790 A | 4/1997 | Grossman et al. |
| 5,640,569 A | 6/1997 | Miller et al. |
| 5,657,389 A | 8/1997 | Houvener |
| 5,664,111 A | 9/1997 | Nahan et al. |
| 5,664,115 A | 9/1997 | Fraser |
| 5,689,652 A | 11/1997 | Lupien et al. |
| 5,694,546 A | 12/1997 | Reisman |
| 5,706,457 A | 1/1998 | Dwyer et al. |
| 5,710,889 A | 1/1998 | Clark et al. |
| 5,715,314 A | 2/1998 | Payne et al. |
| 5,715,402 A | 2/1998 | Popolo |
| 5,717,989 A | 2/1998 | Tozzoli et al. |
| 5,721,908 A | 2/1998 | Lagarde et al. |
| 5,722,418 A | 3/1998 | Bro |
| 5,727,165 A | 3/1998 | Ordish et al. |
| 5,737,599 A | 4/1998 | Rowe et al. |
| 5,760,917 A | 6/1998 | Sheridan |
| 5,761,496 A | 6/1998 | Hattori |
| 5,761,655 A | 6/1998 | Hoffman |
| 5,761,662 A | 6/1998 | Dasan |
| 5,771,291 A | 6/1998 | Newton et al. |
| 5,771,380 A | 6/1998 | Tanaka et al. |
| 5,778,367 A | 7/1998 | Wesinger, Jr. et al. |
| 5,790,790 A | 8/1998 | Smith et al. |
| 5,794,216 A | 8/1998 | Brown |
| 5,794,219 A | 8/1998 | Brown |
| 5,796,395 A | 8/1998 | de Hond |
| 5,799,285 A | 8/1998 | Klingman |
| 5,803,500 A | 9/1998 | Mossberg |
| 5,818,914 A | 10/1998 | Fujisaki |
| 5,826,244 A | 10/1998 | Huberman |
| 5,835,896 A | 11/1998 | Fisher et al. |
| 5,845,265 A | 12/1998 | Woolston |
| 5,845,266 A | 12/1998 | Lupien et al. |
| 5,850,442 A | 12/1998 | Muftic |
| 5,870,754 A | 2/1999 | Dimitrova et al. |
| 5,872,848 A | 2/1999 | Romney et al. |
| 5,873,069 A | 2/1999 | Reuhl et al. |
| 5,873,080 A | 2/1999 | Coden et al. |
| 5,884,056 A | 3/1999 | Steele |
| 5,890,138 A | 3/1999 | Godin et al. |
| 5,890,175 A | 3/1999 | Wong et al. |
| 5,905,975 A | 5/1999 | Ausubel |
| 5,907,547 A | 5/1999 | Foldare et al. |
| 5,913,215 A | 6/1999 | Rubinstein et al. |
| 5,922,074 A | 7/1999 | Richard et al. |
| 5,924,072 A | 7/1999 | Havens |
| 5,926,794 A | 7/1999 | Fethe |
| 5,948,040 A | 9/1999 | DeLorme et al. |
| 5,948,061 A | 9/1999 | Merriman et al. |
| 5,970,490 A | 10/1999 | Morgenstern |
| 5,974,396 A | 10/1999 | Anderson et al. |
| 5,974,412 A | 10/1999 | Hazlehurst et al. |
| 5,986,662 A | 11/1999 | Argiro et al. |
| 5,987,446 A | 11/1999 | Corey et al. |
| 5,991,739 A | 11/1999 | Cupps et al. |
| 5,999,915 A | 12/1999 | Nahan et al. |
| 6,012,053 A | 1/2000 | Pant et al. |
| 6,029,141 A | 2/2000 | Bezos et al. |
| 6,035,288 A | 3/2000 | Solomon |
| 6,035,402 A | 3/2000 | Vaeth et al. |
| 6,044,363 A | 3/2000 | Mori et al. |
| 6,045,447 A | 4/2000 | Yoshizawa et al. |
| 6,047,264 A | 4/2000 | Fisher et al. |
| 6,049,797 A | 4/2000 | Guha et al. |
| 6,055,518 A | 4/2000 | Franklin et al. |
| 6,058,379 A | 5/2000 | Odom et al. |
| 6,058,417 A | 5/2000 | Hess et al. |
| 6,058,428 A | 5/2000 | Wang et al. |
| 6,061,448 A | 5/2000 | Smith et al. |
| 6,065,041 A | 5/2000 | Lum et al. |
| 6,070,125 A | 5/2000 | Murphy et al. |
| 6,073,117 A | 6/2000 | Oyanagi et al. |
| 6,078,914 A | 6/2000 | Redfern |
| 6,085,176 A | 7/2000 | Woolston |
| 6,104,815 A | 8/2000 | Alcorn et al. |
| 6,119,137 A | 9/2000 | Smith et al. |
| 6,128,649 A | 10/2000 | Smith et al. |
| 6,141,010 A | 10/2000 | Hoyle |
| 6,167,382 A | 12/2000 | Sparks et al. |
| 6,178,408 B1 | 1/2001 | Coppie et al. |
| 6,185,558 B1 | 2/2001 | Bowman et al. |
| 6,192,407 B1 | 2/2001 | Smith et al. |
| 6,199,077 B1 | 3/2001 | Inala et al. |
| 6,202,051 B1 | 3/2001 | Woolston |
| 6,202,061 B1 | 3/2001 | Khosla et al. |
| 6,226,412 B1 | 5/2001 | Schwab |
| 6,243,691 B1 | 6/2001 | Fisher et al. |
| 6,269,238 B1 | 7/2001 | Iggulden |
| 6,271,840 B1 | 8/2001 | Finseth et al. |
| 6,275,820 B1 | 8/2001 | Navin-Chandra et al. |
| 6,275,829 B1 | 8/2001 | Angiulo et al. |
| 6,356,879 B2 | 3/2002 | Aggarwal et al. |
| 6,356,905 B1 | 3/2002 | Gershman et al. |
| 6,356,908 B1 | 3/2002 | Brown et al. |
| 6,366,899 B1 | 4/2002 | Kernz |
| 6,370,527 B1 | 4/2002 | Singhal |
| 6,373,933 B1 | 4/2002 | Sarkki et al. |
| 6,374,260 B1 | 4/2002 | Hoffert et al. |

(56) References Cited

U.S. PATENT DOCUMENTS

| | | |
|---|---|---|
| 6,381,510 B1 | 4/2002 | Amidhozour et al. |
| 6,415,270 B1 | 7/2002 | Rackson et al. |
| 6,415,320 B1 | 7/2002 | Hess et al. |
| 6,434,556 B1 | 8/2002 | Levin et al. |
| 6,456,307 B1 | 9/2002 | Bates et al. |
| 6,460,020 B1 | 10/2002 | Pool et al. |
| 6,466,917 B1 | 10/2002 | Goyal et al. |
| 6,484,149 B1 | 11/2002 | Jammes et al. |
| 6,489,968 B1 | 12/2002 | Ortega et al. |
| 6,522,955 B1 | 2/2003 | Colborn |
| 6,523,037 B1 | 2/2003 | Monahan et al. |
| 6,601,061 B1 | 7/2003 | Holt et al. |
| 6,604,107 B1 | 8/2003 | Wang |
| 6,625,764 B1 | 9/2003 | Dawson |
| 6,643,696 B2 | 11/2003 | Davis et al. |
| 6,661,431 B1 | 12/2003 | Stuart et al. |
| 6,665,838 B1 | 12/2003 | Brown et al. |
| 6,675,178 B1 | 1/2004 | Chinchar et al. |
| 6,694,436 B1 | 2/2004 | Audebert |
| 6,701,310 B1 | 3/2004 | Sugiura et al. |
| 6,718,536 B2 | 4/2004 | Dupaquis |
| 6,725,268 B1 | 4/2004 | Jacket et al. |
| 6,728,704 B2 | 4/2004 | Mao et al. |
| 6,732,161 B1 | 5/2004 | Hess et al. |
| 6,732,162 B1 | 5/2004 | Wood et al. |
| 6,801,909 B2 | 10/2004 | Delgado et al. |
| 6,856,963 B1 | 2/2005 | Hurwitz |
| 6,889,054 B2 | 5/2005 | Himmel et al. |
| 6,907,401 B1 | 6/2005 | Vittal et al. |
| 6,912,505 B2 | 6/2005 | Linden et al. |
| 6,925,307 B1 | 8/2005 | Mamdani et al. |
| 6,978,273 B1 | 12/2005 | Bonneau et al. |
| 7,043,450 B2 | 5/2006 | Velez et al. |
| 7,069,242 B1 | 6/2006 | Sheth et al. |
| 7,076,453 B2 | 7/2006 | Jammes et al. |
| 7,076,504 B1 | 7/2006 | Handel et al. |
| 7,080,030 B2 | 7/2006 | Eglen et al. |
| 7,099,891 B2 | 8/2006 | Harris et al. |
| 7,100,111 B2 | 8/2006 | McElfresh et al. |
| 7,100,195 B1 | 8/2006 | Underwood |
| 7,117,207 B1 | 10/2006 | Kerschberg et al. |
| 7,127,416 B1 | 10/2006 | Tenorio |
| 7,165,091 B2 | 1/2007 | Lunenfeld |
| 7,167,910 B2 | 1/2007 | Farnham et al. |
| 7,216,115 B1 | 5/2007 | Walters et al. |
| 7,240,016 B1 | 7/2007 | Sturgis et al. |
| 7,254,547 B1 | 8/2007 | Beck et al. |
| 7,305,614 B2 | 12/2007 | Chen et al. |
| 7,318,037 B2 | 1/2008 | Solari |
| 7,324,966 B2 | 1/2008 | Scheer |
| 7,340,249 B2 | 3/2008 | Moran et al. |
| 7,349,668 B2 | 3/2008 | Ilan et al. |
| 7,353,188 B2 | 4/2008 | Yim et al. |
| 7,366,755 B1 | 4/2008 | Cuomo et al. |
| 7,379,890 B2 | 5/2008 | Myr et al. |
| 7,380,217 B2 | 5/2008 | Gvelesiani |
| 7,383,320 B1 | 6/2008 | Silberstein et al. |
| 7,401,025 B1 | 7/2008 | Lokitz |
| 7,447,646 B1 | 11/2008 | Agarwal et al. |
| 7,451,476 B1 | 11/2008 | Banks et al. |
| 7,454,464 B2 | 11/2008 | Puthenkulam et al. |
| 7,457,730 B2 | 11/2008 | Degnan |
| 7,493,521 B1 | 2/2009 | Li et al. |
| 7,496,525 B1 | 2/2009 | Mitchell |
| 7,496,527 B2 | 2/2009 | Silverstein et al. |
| 7,496,582 B2 | 2/2009 | Farnham et al. |
| 7,516,094 B2 | 4/2009 | Perkowski |
| 7,539,696 B1 | 5/2009 | Greener et al. |
| 7,546,625 B1 | 6/2009 | Kamangar |
| 7,552,067 B2 | 6/2009 | Nephew et al. |
| 7,565,615 B2 | 7/2009 | Ebert |
| 7,606,743 B2 | 10/2009 | Orzell et al. |
| 7,610,212 B2 | 10/2009 | Klett et al. |
| 7,653,573 B2 | 1/2010 | Hayes, Jr. et al. |
| 7,834,883 B2 | 11/2010 | Adams |
| 7,904,348 B2 | 3/2011 | Johnson et al. |
| 7,912,748 B1 | 3/2011 | Rosenberg et al. |
| 7,921,031 B2 | 4/2011 | Crysel et al. |
| 7,941,751 B2 | 5/2011 | Ebert |
| 7,979,340 B2 | 7/2011 | MacDonald Korth et al. |
| 7,983,950 B2 | 7/2011 | De Vita |
| 7,983,963 B2 | 7/2011 | Byrne et al. |
| 8,086,643 B1 | 12/2011 | Tenorio |
| 8,112,303 B2 | 2/2012 | Eglen et al. |
| 8,140,989 B2 | 3/2012 | Cohen et al. |
| 8,166,155 B1 * | 4/2012 | Rachmeler .......... G06F 11/3466 709/224 |
| 8,204,799 B1 | 6/2012 | Murray et al. |
| 8,214,264 B2 | 7/2012 | Kasavin et al. |
| 8,214,804 B2 | 7/2012 | Robertson |
| 8,260,852 B1 | 9/2012 | Cselle |
| 8,312,056 B1 | 11/2012 | Peng et al. |
| 8,326,662 B1 | 12/2012 | Byrne et al. |
| 8,370,269 B2 | 2/2013 | MacDonald-Korth et al. |
| 8,370,435 B1 | 2/2013 | Bonefas et al. |
| 8,392,356 B2 | 3/2013 | Stoner et al. |
| 8,452,691 B2 | 5/2013 | MacDonald Korth et al. |
| 8,473,316 B1 | 6/2013 | Panzitta et al. |
| 8,494,912 B2 | 7/2013 | Fraser et al. |
| 8,545,265 B2 | 10/2013 | Sakamoto et al. |
| 8,577,740 B1 | 11/2013 | Murray et al. |
| 8,583,480 B2 | 11/2013 | Byrne |
| 8,630,960 B2 | 1/2014 | Gross |
| 8,676,632 B1 | 3/2014 | Watson et al. |
| 8,693,494 B2 | 4/2014 | Fiatal |
| 8,719,075 B2 | 5/2014 | MacDonald Korth et al. |
| 8,793,650 B2 | 7/2014 | Hilerio et al. |
| 9,047,341 B2 | 6/2015 | Pan |
| 9,047,642 B2 | 6/2015 | Byrne et al. |
| 9,448,692 B1 | 9/2016 | Mierau et al. |
| 9,483,788 B2 | 11/2016 | Martin |
| 9,741,080 B1 | 8/2017 | Byrne |
| 9,747,622 B1 | 8/2017 | Johnson et al. |
| 9,805,425 B2 | 10/2017 | MacDonald-Korth et al. |
| 9,928,752 B2 | 3/2018 | Byrne et al. |
| 9,940,659 B1 | 4/2018 | Behbahani et al. |
| 10,013,500 B1 * | 7/2018 | McClintock .......... H04L 67/22 |
| 10,074,118 B1 | 9/2018 | Johnson et al. |
| 10,102,287 B2 | 10/2018 | Martin |
| 10,269,081 B1 | 4/2019 | Byrne |
| 10,423,997 B2 | 9/2019 | MacDonald-Korth et al. |
| 10,534,845 B2 * | 1/2020 | Noursalehi .......... G06F 40/106 |
| 10,769,219 B1 | 9/2020 | Martin |
| 10,810,654 B1 | 10/2020 | Robertson et al. |
| 10,853,891 B2 | 12/2020 | MacDonald-Korth et al. |
| 10,872,350 B1 | 12/2020 | Hu et al. |
| 10,896,451 B1 | 1/2021 | Johnson et al. |
| 10,929,890 B2 | 2/2021 | Knab et al. |
| 10,949,876 B2 | 3/2021 | Johnson et al. |
| 10,970,463 B2 * | 4/2021 | Noursalehi .......... G06F 40/106 |
| 10,970,769 B2 | 4/2021 | Iqbal |
| 2001/0014868 A1 | 8/2001 | Herz et al. |
| 2001/0034667 A1 | 10/2001 | Petersen |
| 2001/0034668 A1 | 10/2001 | Whitworth |
| 2001/0044751 A1 | 11/2001 | Pugliese, III et al. |
| 2001/0047290 A1 | 11/2001 | Petras et al. |
| 2001/0047308 A1 | 11/2001 | Kaminsky et al. |
| 2001/0051996 A1 | 12/2001 | Cooper et al. |
| 2002/0002513 A1 | 1/2002 | Chiasson |
| 2002/0007321 A1 | 1/2002 | Burton |
| 2002/0007356 A1 | 1/2002 | Rice et al. |
| 2002/0013721 A1 | 1/2002 | Dabbiere et al. |
| 2002/0019763 A1 | 2/2002 | Linden et al. |
| 2002/0022995 A1 | 2/2002 | Miller et al. |
| 2002/0023059 A1 | 2/2002 | Bari et al. |
| 2002/0026390 A1 | 2/2002 | Ulenas et al. |
| 2002/0029187 A1 | 3/2002 | Meehan et al. |
| 2002/0038312 A1 | 3/2002 | Donner et al. |
| 2002/0040352 A1 | 4/2002 | McCormick |
| 2002/0042738 A1 | 4/2002 | Srinivasan et al. |
| 2002/0049622 A1 | 4/2002 | Lettich et al. |
| 2002/0056044 A1 | 5/2002 | Andersson |
| 2002/0065774 A1 | 5/2002 | Young et al. |
| 2002/0099578 A1 | 7/2002 | Eicher, Jr. et al. |

(56) References Cited

U.S. PATENT DOCUMENTS

| | | |
|---|---|---|
| 2002/0099579 A1 | 7/2002 | Stowell et al. |
| 2002/0099602 A1 | 7/2002 | Moskowitz et al. |
| 2002/0107718 A1 | 8/2002 | Morrill et al. |
| 2002/0107853 A1 | 8/2002 | Hofmann et al. |
| 2002/0111826 A1 | 8/2002 | Potter et al. |
| 2002/0120537 A1 | 8/2002 | Morea et al. |
| 2002/0120609 A1 | 8/2002 | Lang et al. |
| 2002/0123957 A1 | 9/2002 | Notarius et al. |
| 2002/0124100 A1 | 9/2002 | Adams |
| 2002/0129282 A1 | 9/2002 | Hopkins |
| 2002/0133502 A1 | 9/2002 | Rosenthal et al. |
| 2002/0138399 A1 | 9/2002 | Hayes et al. |
| 2002/0147625 A1 | 10/2002 | Koike, Jr. |
| 2002/0156802 A1 | 10/2002 | Takayama et al. |
| 2002/0161648 A1 | 10/2002 | Mason et al. |
| 2002/0161664 A1 | 10/2002 | Shaya et al. |
| 2002/0188777 A1 | 12/2002 | Kraft et al. |
| 2002/0194049 A1 | 12/2002 | Boyd |
| 2002/0198784 A1 | 12/2002 | Shaak et al. |
| 2002/0198882 A1 | 12/2002 | Linden et al. |
| 2003/0004855 A1 | 1/2003 | Dutta et al. |
| 2003/0005046 A1 | 1/2003 | Kavanagh et al. |
| 2003/0009362 A1 | 1/2003 | Cifani et al. |
| 2003/0009392 A1 | 1/2003 | Perkowski |
| 2003/0014400 A1 | 1/2003 | Siegel |
| 2003/0028451 A1 | 2/2003 | Ananian |
| 2003/0028605 A1 | 2/2003 | Millett et al. |
| 2003/0032409 A1 | 2/2003 | Hutcheson et al. |
| 2003/0035138 A1 | 2/2003 | Schilling |
| 2003/0036914 A1 | 2/2003 | Fitzpatrick et al. |
| 2003/0040970 A1 | 2/2003 | Miller |
| 2003/0041008 A1 | 2/2003 | Grey et al. |
| 2003/0046149 A1 | 3/2003 | Wong |
| 2003/0069740 A1 | 4/2003 | Zeidman |
| 2003/0069790 A1 | 4/2003 | Kane |
| 2003/0069825 A1 | 4/2003 | Hoffman et al. |
| 2003/0083961 A1 | 5/2003 | Bezos et al. |
| 2003/0088467 A1 | 5/2003 | Culver |
| 2003/0088511 A1 | 5/2003 | Korboulonis et al. |
| 2003/0093331 A1 | 5/2003 | Childs et al. |
| 2003/0097352 A1 | 5/2003 | Gutta et al. |
| 2003/0105682 A1 | 6/2003 | Dicker et al. |
| 2003/0110100 A1 | 6/2003 | Wirth, Jr. |
| 2003/0119492 A1 | 6/2003 | Timmins et al. |
| 2003/0131095 A1 | 7/2003 | Kumhyr et al. |
| 2003/0139969 A1 | 7/2003 | Scroggie et al. |
| 2003/0140007 A1 | 7/2003 | Kramer et al. |
| 2003/0140121 A1 | 7/2003 | Adams |
| 2003/0158792 A1 | 8/2003 | Perkowski |
| 2003/0163340 A1 | 8/2003 | Fitzpatrick et al. |
| 2003/0167213 A1 | 9/2003 | Jammes et al. |
| 2003/0167222 A1 | 9/2003 | Mehrotra et al. |
| 2003/0177103 A1 | 9/2003 | Ivanov et al. |
| 2003/0187745 A1 | 10/2003 | Hobday et al. |
| 2003/0200156 A1 | 10/2003 | Roseman et al. |
| 2003/0204449 A1 | 10/2003 | Kotas et al. |
| 2003/0217002 A1 | 11/2003 | Enborg |
| 2003/0220835 A1 | 11/2003 | Barnes, Jr. |
| 2004/0006509 A1 | 1/2004 | Mannik et al. |
| 2004/0015416 A1 | 1/2004 | Foster et al. |
| 2004/0029567 A1 | 2/2004 | Timmins et al. |
| 2004/0041836 A1 | 3/2004 | Zaner et al. |
| 2004/0044563 A1 | 3/2004 | Stein |
| 2004/0055017 A1 | 3/2004 | Delpuch et al. |
| 2004/0058710 A1 | 3/2004 | Timmins et al. |
| 2004/0073476 A1 | 4/2004 | Donahue et al. |
| 2004/0078388 A1 | 4/2004 | Melman |
| 2004/0107136 A1 | 6/2004 | Nemirofsky et al. |
| 2004/0117242 A1 | 6/2004 | Conrad et al. |
| 2004/0122083 A1 | 6/2004 | Pettit et al. |
| 2004/0122681 A1 | 6/2004 | Ruvolo et al. |
| 2004/0122735 A1 | 6/2004 | Meshkin |
| 2004/0122855 A1 | 6/2004 | Ruvolo et al. |
| 2004/0128183 A1 | 7/2004 | Challey et al. |
| 2004/0128283 A1 | 7/2004 | Wang et al. |
| 2004/0128320 A1 | 7/2004 | Grove et al. |
| 2004/0143731 A1 | 7/2004 | Audebert et al. |
| 2004/0148232 A1 | 7/2004 | Fushimi et al. |
| 2004/0172323 A1 | 9/2004 | Stamm |
| 2004/0172379 A1 | 9/2004 | Mott et al. |
| 2004/0174979 A1 | 9/2004 | Hutton et al. |
| 2004/0186766 A1 | 9/2004 | Fellenstein et al. |
| 2004/0199496 A1 | 10/2004 | Liu et al. |
| 2004/0199905 A1 | 10/2004 | Fagin et al. |
| 2004/0204989 A1 | 10/2004 | Dicker et al. |
| 2004/0204991 A1 | 10/2004 | Monahan et al. |
| 2004/0230989 A1 | 11/2004 | Macey et al. |
| 2004/0240642 A1 | 12/2004 | Crandell et al. |
| 2004/0249727 A1 | 12/2004 | Cook, Jr. et al. |
| 2004/0267717 A1 | 12/2004 | Slackman |
| 2005/0002166 A1 | 1/2005 | Dinnage et al. |
| 2005/0010925 A1 | 1/2005 | Khawand et al. |
| 2005/0038733 A1 | 2/2005 | Foster et al. |
| 2005/0044254 A1 | 2/2005 | Smith |
| 2005/0055306 A1 | 3/2005 | Miller et al. |
| 2005/0060664 A1 | 3/2005 | Rogers |
| 2005/0097204 A1 | 5/2005 | Horowitz et al. |
| 2005/0114229 A1 | 5/2005 | Ackley et al. |
| 2005/0120311 A1 | 6/2005 | Thrall |
| 2005/0131837 A1 | 6/2005 | Sanctis et al. |
| 2005/0144064 A1 | 6/2005 | Calabria et al. |
| 2005/0193333 A1 | 9/2005 | Ebert |
| 2005/0197846 A1 | 9/2005 | Pezaris et al. |
| 2005/0197950 A1 | 9/2005 | Moya et al. |
| 2005/0198031 A1 | 9/2005 | Pezaris et al. |
| 2005/0202390 A1 | 9/2005 | Allen et al. |
| 2005/0203888 A1 | 9/2005 | Woosley et al. |
| 2005/0216300 A1 | 9/2005 | Appelman et al. |
| 2005/0262067 A1 | 11/2005 | Lee et al. |
| 2005/0273378 A1 | 12/2005 | MacDonald-Korth et al. |
| 2006/0009994 A1 | 1/2006 | Hogg et al. |
| 2006/0010105 A1 | 1/2006 | Sarakkai et al. |
| 2006/0015498 A1 | 1/2006 | Sarmiento et al. |
| 2006/0031240 A1 | 2/2006 | Eyal et al. |
| 2006/0041638 A1 | 2/2006 | Whittaker et al. |
| 2006/0058048 A1 | 3/2006 | Kapoor et al. |
| 2006/0069623 A1 | 3/2006 | MacDonald Korth et al. |
| 2006/0085251 A1 | 4/2006 | Greene |
| 2006/0173817 A1 | 8/2006 | Chowdhury et al. |
| 2006/0206479 A1 | 9/2006 | Mason |
| 2006/0218049 A1 | 9/2006 | Walker et al. |
| 2006/0230035 A1 | 10/2006 | Bailey et al. |
| 2006/0235752 A1 | 10/2006 | Kavanagh et al. |
| 2006/0259360 A1 | 11/2006 | Flinn et al. |
| 2006/0271671 A1 | 11/2006 | Hansen |
| 2006/0282304 A1 | 12/2006 | Bedard et al. |
| 2007/0005424 A1 | 1/2007 | Arauz |
| 2007/0027760 A1 | 2/2007 | Collins et al. |
| 2007/0027814 A1 | 2/2007 | Fouriniemi |
| 2007/0073641 A1 | 3/2007 | Perry et al. |
| 2007/0077025 A1 | 4/2007 | Mino |
| 2007/0078726 A1 | 4/2007 | MacDonald Korth et al. |
| 2007/0078849 A1 | 4/2007 | Slothouber |
| 2007/0083437 A1 | 4/2007 | Hamor |
| 2007/0094597 A1 | 4/2007 | Rostom |
| 2007/0100803 A1 | 5/2007 | Cava |
| 2007/0130090 A1 | 6/2007 | Staib et al. |
| 2007/0160345 A1 | 7/2007 | Sakai et al. |
| 2007/0162379 A1 | 7/2007 | Skinner |
| 2007/0174108 A1 | 7/2007 | Monster |
| 2007/0192168 A1 | 8/2007 | Van Luchene |
| 2007/0192181 A1 | 8/2007 | Asdourian |
| 2007/0206606 A1 | 9/2007 | Coleman et al. |
| 2007/0214048 A1 | 9/2007 | Chan et al. |
| 2007/0226679 A1 | 9/2007 | Jayamohan et al. |
| 2007/0233565 A1 | 10/2007 | Herzog et al. |
| 2007/0239534 A1 | 10/2007 | Liu et al. |
| 2007/0245013 A1 | 10/2007 | Saraswathy et al. |
| 2007/0260520 A1 | 11/2007 | Jha et al. |
| 2007/0282666 A1 | 12/2007 | Afeyan et al. |
| 2007/0288298 A1 | 12/2007 | Gutierrez et al. |
| 2007/0299743 A1 | 12/2007 | Staib et al. |
| 2008/0015938 A1 | 1/2008 | Haddad et al. |
| 2008/0021763 A1 | 1/2008 | Merchant |

(56) References Cited

U.S. PATENT DOCUMENTS

| | | |
|---|---|---|
| 2008/0052152 A1 | 2/2008 | Yufik |
| 2008/0071640 A1 | 3/2008 | Nguyen |
| 2008/0082394 A1 | 4/2008 | Floyd et al. |
| 2008/0103893 A1 | 5/2008 | Nagarajan et al. |
| 2008/0120342 A1 | 5/2008 | Reed et al. |
| 2008/0126205 A1 | 5/2008 | Evans et al. |
| 2008/0126476 A1 | 5/2008 | Nicholas et al. |
| 2008/0133305 A1 | 6/2008 | Yates et al. |
| 2008/0140765 A1 | 6/2008 | Kelaita et al. |
| 2008/0162574 A1 | 7/2008 | Gilbert |
| 2008/0195476 A1 | 8/2008 | Marchese et al. |
| 2008/0201218 A1 | 8/2008 | Broder et al. |
| 2008/0215456 A1 | 9/2008 | West et al. |
| 2008/0288338 A1 | 11/2008 | Wiseman et al. |
| 2008/0294536 A1 | 11/2008 | Taylor et al. |
| 2008/0300909 A1 | 12/2008 | Rikhtverchik et al. |
| 2008/0301009 A1 | 12/2008 | Plaster et al. |
| 2008/0305869 A1 | 12/2008 | Konforty et al. |
| 2008/0313010 A1 | 12/2008 | Jepson et al. |
| 2009/0006190 A1 | 1/2009 | Lucash et al. |
| 2009/0030755 A1 | 1/2009 | Altberg et al. |
| 2009/0030775 A1 | 1/2009 | Vieri |
| 2009/0037355 A1 | 2/2009 | Brave et al. |
| 2009/0106080 A1 | 4/2009 | Carrier et al. |
| 2009/0106127 A1 | 4/2009 | Purdy et al. |
| 2009/0110181 A1 | 4/2009 | Koenig et al. |
| 2009/0119167 A1 | 5/2009 | Kendall et al. |
| 2009/0157537 A1 | 6/2009 | Miller |
| 2009/0164323 A1 | 6/2009 | Byrne |
| 2009/0164442 A1 | 6/2009 | Shani et al. |
| 2009/0182589 A1 | 7/2009 | Kendall et al. |
| 2009/0204848 A1 | 8/2009 | Kube et al. |
| 2009/0222348 A1 | 9/2009 | Ransom et al. |
| 2009/0222737 A1 | 9/2009 | Liesche et al. |
| 2009/0228918 A1 | 9/2009 | Rolff et al. |
| 2009/0234722 A1 | 9/2009 | Evevsky |
| 2009/0240582 A1 | 9/2009 | Sheldon-Neal et al. |
| 2009/0276284 A1 | 11/2009 | Yost |
| 2009/0276305 A1 | 11/2009 | Clopp |
| 2009/0292677 A1 | 11/2009 | Kim |
| 2009/0293019 A1 | 11/2009 | Raffel et al. |
| 2009/0313173 A1 | 12/2009 | Singh et al. |
| 2010/0042684 A1 | 2/2010 | Broms et al. |
| 2010/0070448 A1 | 3/2010 | Omoigui |
| 2010/0076816 A1 | 3/2010 | Phillips |
| 2010/0076851 A1 | 3/2010 | Jewell, Jr. |
| 2010/0094673 A1 | 4/2010 | Lobo et al. |
| 2010/0107123 A1 | 4/2010 | Sareen et al. |
| 2010/0145831 A1 | 6/2010 | Esfandiari et al. |
| 2010/0146413 A1 | 6/2010 | Yu |
| 2010/0228617 A1 | 9/2010 | Ransom et al. |
| 2011/0010656 A1 | 1/2011 | Mokotov |
| 2011/0055054 A1 | 3/2011 | Glasson |
| 2011/0060621 A1 | 3/2011 | Weller et al. |
| 2011/0103699 A1 | 5/2011 | Ke et al. |
| 2011/0131253 A1 | 6/2011 | Peukert et al. |
| 2011/0137973 A1* | 6/2011 | Wei .................. H04L 67/28 709/202 |
| 2011/0145226 A1 | 6/2011 | Gollapudi et al. |
| 2011/0153383 A1 | 6/2011 | Bhattacharjya et al. |
| 2011/0153663 A1 | 6/2011 | Koren et al. |
| 2011/0173076 A1 | 7/2011 | Eggleston et al. |
| 2011/0191319 A1 | 8/2011 | Nie et al. |
| 2011/0196802 A1 | 8/2011 | Ellis et al. |
| 2011/0225050 A1 | 9/2011 | Varghese |
| 2011/0231226 A1 | 9/2011 | Golden |
| 2011/0231383 A1 | 9/2011 | Smyth et al. |
| 2011/0258049 A1 | 10/2011 | Ramer et al. |
| 2011/0271204 A1 | 11/2011 | Jones et al. |
| 2011/0276513 A1 | 11/2011 | Erhart et al. |
| 2011/0289068 A1 | 11/2011 | Teevan et al. |
| 2012/0005187 A1 | 1/2012 | Chavanne |
| 2012/0030067 A1 | 2/2012 | Pothukuchi et al. |
| 2012/0084135 A1 | 4/2012 | Nissan et al. |
| 2012/0158715 A1 | 6/2012 | Maghoul et al. |
| 2012/0164619 A1 | 6/2012 | Meer |
| 2012/0166299 A1 | 6/2012 | Heinstein et al. |
| 2012/0203723 A1 | 8/2012 | Huang et al. |
| 2012/0231424 A1 | 9/2012 | Caiman et al. |
| 2012/0233312 A1 | 9/2012 | Ramakumar et al. |
| 2012/0278388 A1 | 11/2012 | Kleinbart et al. |
| 2012/0284336 A1 | 11/2012 | Schmidt et al. |
| 2012/0323725 A1 | 12/2012 | Johnston et al. |
| 2013/0031470 A1* | 1/2013 | Daly, Jr. .............. G06F 16/9535 715/243 |
| 2013/0073392 A1 | 3/2013 | Allen et al. |
| 2013/0080200 A1 | 3/2013 | Connolly et al. |
| 2013/0080426 A1 | 3/2013 | Chen et al. |
| 2013/0085893 A1 | 4/2013 | Bhardwaj et al. |
| 2013/0144870 A1 | 6/2013 | Gupta et al. |
| 2013/0145254 A1 | 6/2013 | Masuko et al. |
| 2013/0151331 A1 | 6/2013 | Avner et al. |
| 2013/0151388 A1 | 6/2013 | Falkenborg et al. |
| 2013/0185164 A1 | 7/2013 | Pottjegort |
| 2013/0191409 A1 | 7/2013 | Zeng et al. |
| 2013/0254059 A1 | 9/2013 | Teo |
| 2013/0268561 A1 | 10/2013 | Christie et al. |
| 2014/0019313 A1 | 1/2014 | Hu et al. |
| 2014/0025509 A1 | 1/2014 | Reisz et al. |
| 2014/0032544 A1 | 1/2014 | Mathieu et al. |
| 2014/0114680 A1 | 4/2014 | Mills et al. |
| 2014/0136290 A1 | 5/2014 | Schiestl et al. |
| 2014/0172652 A1 | 6/2014 | Pobbathi et al. |
| 2014/0180758 A1 | 6/2014 | Agarwal et al. |
| 2014/0200959 A1 | 7/2014 | Sarb et al. |
| 2014/0259056 A1 | 9/2014 | Grusd |
| 2014/0289005 A1 | 9/2014 | Laing et al. |
| 2014/0337090 A1 | 11/2014 | Tavares |
| 2014/0372415 A1 | 12/2014 | Fernandez-Ruis |
| 2015/0019958 A1 | 1/2015 | Ying et al. |
| 2015/0089524 A1 | 3/2015 | Cremonesi et al. |
| 2015/0142543 A1 | 5/2015 | Lellouche |
| 2015/0286742 A1* | 10/2015 | Zhang .................. G06F 40/103 715/252 |
| 2015/0287066 A1 | 10/2015 | Wortley et al. |
| 2017/0235788 A1* | 8/2017 | Borisyuk ............ G06F 16/2272 707/723 |
| 2017/0344622 A1 | 11/2017 | Islam et al. |
| 2020/0065357 A1 | 2/2020 | Noursalehi et al. |

FOREIGN PATENT DOCUMENTS

| | | |
|---|---|---|
| EP | 0636993 | 4/1999 |
| EP | 0807891 | 5/2000 |
| EP | 1241603 | 9/2002 |
| GB | 2397400 | 7/2004 |
| GB | 2424098 | 9/2006 |
| JP | 2001283083 | 12/2001 |
| JP | 2002318935 | 10/2002 |
| JP | 2007021920 | 2/2007 |
| JP | 2009505238 | 2/2009 |
| WO | WO1997017663 | 5/1997 |
| WO | WO1998032289 | 7/1998 |
| WO | WO1998047082 | 10/1998 |
| WO | WO1998049641 | 11/1998 |
| WO | WO1999059283 | 11/1999 |
| WO | WO2000025218 | 5/2000 |
| WO | WO20000068851 | 11/2000 |
| WO | WO2001009803 | 2/2001 |
| WO | WO2001082135 | 11/2001 |
| WO | WO2001097099 | 12/2001 |
| WO | WO2002037234 | 5/2002 |
| WO | WO2003094080 | 11/2003 |
| WO | WO2007021920 | 2/2007 |
| WO | WO2012093410 | 7/2012 |
| WO | WO2015116038 | 8/2015 |
| WO | WO2015176071 | 11/2015 |

OTHER PUBLICATIONS

Tjostheim et al., "A case study of an on-line auction for the World Wide Web," printed from www.nr.no/gem/elcom/puplikasjoner/enter98e.html on Jun. 10, 1990, 10 pages.

(56) References Cited

OTHER PUBLICATIONS

Turban, "Auctions and Bidding on the Internet: An Assessment," Electronic Markets—The International Journal, Dec. 1997, 5 pages, vol. 7, No. 4.

ubid.com, "How do I Updated my Address, Phone, Credit Card, Password, etc.?" printed from web.archive.org/web/20010208113903/www.ubid.com/help/topic13asp on Aug. 30, 2007.

ubid.com, "How do I track my shipment?" printed from web.archive.org/web/20010331032659/www.ubid.com/help/topic27.asp on Aug. 30, 2007.

ubid.com, "Can I track all of my bids from My Page?" printed from web.archive.org/web/20010208114049/www.ubid.com/help/topic14.asp on Aug. 30, 2007.

Van Heck et al., "Experiences with Electronic Auctions in the Dutch Flower Industry," Electronic Markets—The International Journal, Dec. 1997, 6 pages, vol. 7, No. 4.

Verizon Wireless, "Verizon Wireless Customers Get It NowSM; Get Games, Get Pix, Get Ring Tones and Get Going in Full Color," press release to PRNEWSWIRE, Sep. 23, 2002.

Warbelow et al., "AUCNET: TV Auction Network System," Harvard Business School 9-190-001, Jul. 19, 1989, Rev. Apr. 12, 1996, pp. 1-15.

Weber, "How Financial Markets are Going On-line," Electronic Markets—The International Journal, Oct. 1993, 2 pages. vol. 3, No. 3.

Wireless Internet, "DailyShopper Selects 2Roam to Enable Mobile Customers to Retrieve Nearby Sales and Promotions Information," Wireless Internet, Apr. 2001.

Wireless Week, "Verizon Wireless Gets Going on BREW Agenda," Wireless Week, Sep. 23, 2002.

xchanger.net, webpage printed from www.auctiva.com/showcases/as_4sale.asp?uid=exchanger, undated but at least as early as Oct. 12, 2000.

Yu et al., "Distributed Reputation Management for Electronic Commerce," Computational Intelligence, 2002, pp. 535-549, vol. 18, No. 4.

Zetmeir, Auction Incentive Marketing, print of all pages of website found at home.earthlink.net/~bidpointz/ made Oct. 8, 2004.

Zimmermann, "Integration of Financial Services: The TeleCounter," Electronic Markets—The International Journal, Oct. 1993, 1 page, vol. 3, No. 3.

Zwass, "Electronic Commerce: Structures and Issues," International Journal of Electronic Commerce, Fall 1996, pp. 3-23, vol. 1, No. 1.

Message Passing from Wikipedia, archived May 6, 2016, retrieved from https://en.wikipedia.org/wiki/message_passing, 4 pages.

Di et al., "A New Implementation for Ontology Mapping Based enterprise Semantic Interoperation," by Xiaofeng Di and Yushun Fan, Applied Mechanics and Materials, vols. 16-19 (2009), pp. 644-648 (Year:2009).

Nicolle et a., "XML Integration and Toolkit for B2B Applications," by Christophe Nicolle, Kokou Yetongnon, and Jean-Claude Simon, Journal of Database Management, Oct.-Dec. 2003 (Year: 2003).

V. Aksakalli, Optimizing direct response in Internet display advertising, Elsevier, vol. 11, Issue 3, May-Jun. 2012, pp. 229-240. (Year: 2012).

Gallagher et al. A framework for targeting banner advertising on the internet. IEEE, pp. 265-274 (Year: 1997).

Alex, Neil,"Optimizing Search Results in Elasticsearch with Scoring and Boosting", Mar. 18, 2015, Qbox.io, accessed at [https://qbox.io/blog/optimizing-search-results-in-elasticsearch0with-scoring-and-boosting] (year: 2015).

Hybrid algorithms for recommending new items. Cremonesi et al., ResearchGate, Google, (year:2011).

Lee, "AUCNET: Electronic Intermediary for Used-Car Transactions," Electronic Market—The International Journal, Dec. 1997, pp. 24-28, vol. 7, No. 4.

T.Y. Lee, S. Li and R. Wei, "Needs-Centric Searching and Ranking Based on Customer Reviews," 2008 10th IEEE Conference on E-Commerce Technology and the Fifth IEEE Conference on Enterprise Computing, E-Commerce and E-Services, Washington, DC, 2008, pp. 128-135. (Year: 2008).

Levy, Michael, and Dhruv Grewal. "Supply chain management in a networked economy." Journal Retailing 76.4 (2000): 415-429.

LIVE365 press release, "Live365 to Offer Opt-ln Advertising on Its Website," Oct. 15, 2004.

London Business School, "Overture and Google: Internet Pay-Per-Click (PPC) Advertising Options," Mar. 2003.

M2 Presswire, "Palm, Inc.: Palm unveils new web browser optimised for handhelds; HTML browser offers high-speed web-browsing option," Mar. 13, 2002.

Malone et al., "Electronic Markets and Electronic Hierarchies," Communications of the ACM, Jun. 1987, pp. 484-497, vol. 30, No. 6.

Mansell et al., "Electronic Trading Networks: The Route to Competitive Advantage?" Electronic Markets—The International Journal, Oct. 1993, 1 page, vol. 3, No. 3.

Mardesich, "Onsale takes auction gavel electronic," Computer Reseller News, Jul. 8, 1996, pp. 2, 32.

Marteau, "Shop with One Click, Anywhere, Anytime," Information Management and Consulting, 2000, pp. 44-46, vol. 15, No. 4.

Massimb et al., "Electronic Trading, Market Structure and Liquidity," Financial Analysts Journal, Jan.-Feb. 1994, pp. 39-49.

McGinnity, "Build Your Weapon," PC Magazine, Apr. 24, 2011, printed from www.pcmag.com/print_article2?0,1217, a%253D3955,00.asp.

Meade, "Visual 360: a performance appraisal system that's 'fun,'" HR Magazine, 44, 7, 118(3), Jul. 1999.

"Mediappraise: Mediappraise Receives National Award for Web-Based Technology That Enables Companies to Solve Thorny HR Problem," Dec. 14, 1998.

Medvinsky et al., "Electronic Currency for the Internet," Electronic Markets—The International Journal, Oct. 1993, 2 pages, vol. 3, No. 3.

metails.com, www.metails.com homepage, printed Oct. 13, 2004.

Microsoft Computer Dictionary, Fifth Edition, front matter and p. 33.

Microsoft Computer Dictionary, Fifth Edition, front matter, back matter, and pp. 479,486.

Neches, "FAST—A Research Project in Electronic Commerce," Electronic Markets—The International Journal, Oct. 1993, 4 pages, vol. 3., No. 3.

Neisser, "Which is better for Social Media Monitoring: TweetDeck or SproutSocial" Mar. 17, 2011, Social Media Examiner, https://www.socialmediaexaminer.com/which-is-better-for-social-media-monitoring-tweetdeck-or-sproutsocial/.

Neo, "The implementation of an electronic market for pig trading in Singapore," Journal of Strategic Information Systems, Dec. 1992, pp. 278-288, vol. 1, No. 5.

O'Mahony, "An X.500-based Product Catalogue," Electronic Markets—The International Journal, Oct. 1993, 2 pages, vol. 3, No. 3.

"Onsale: Onsale Brings Thrill of Auctions and Bargain Hunting Online: Unique Internet retail services debuts with week-long charity auction for the Computer Museum in Boston," May 24, 1995, printed from www.dialogweb.com/cgi/dwclient?dwcommand,DWEBPRINT%20810-489267.

"Onsale joins fray as online shopping pcks up speed: Internet Booms," Comptuer Reseller News, Jun. 5, 1995.

Palm, Inc., PalmTM Web Pro Handbook, copyright 2002-2003.

Post et al., "Application of Auctions as a Pricing Mechanism for the Interchange of Electric Power," IEEE Transactions of Power Systems, Aug. 1995, pp. 1580-1584, vol. 10, No. 3.

Preist et al., "Adaptive agents in a persistent shout double auction," International Conference on Information and Computation, Proceedings of the first international conference on information and computation economies, Oct. 25-28, 1998, Charleston, United States, pp. 11-18.

Qualcomm, "Brew Developer Support," printed from web.archive.org/web/20020209194207/http://www.qualcomm.com/brew/developer/support/kb/52.html on Aug. 30, 2007.

RCR Wireless News, "Lockheed Martin to use 2Roam's technology for wireless platform," RCR Wireless News, Sep. 10, 2001.

(56) References Cited

OTHER PUBLICATIONS

Reck, "Formally Specifying an Automated Trade Execution System," J. Systems Software, 1993, pp. 245-252, vol. 21.
Reck, "Trading-Process Characteristics of Electronic Auctions," Electronic Markets—The International Journal, Dec. 1997, pp. 17-23, vol. 7, No. 4.
repcheck.com, www.repcheck.com homepage, printed from web.archive.org/web/20020330183132/http://repcheck.com on Sep. 5, 2009.
Resnick et al., "Reputation Systems," Communications of the ACM, Dec. 2000, pp. 45-48, vol. 43, No. 12.
Rockoff et al., "Design of an Internet-based system for remote Dutch auctions," Internet Research: Electronic Networking Applications and Policy, 1995, pp. 10-16, vol. 5, No. 4.
Rodriguez, Camille, HootSuite vs. social Oomph vs. Tweekdeck, Jan. 4, 2012, http://polkadotimpressions.com/2012/01/04/hootsuite-vs-social-oopmphvs.tweetdeck/ (Year: 2012).
Rose, "Vendors strive to undo Adobe lock-hold," Computer Reseller News, Feb. 5, 1996, n 66669, p. 71(7).
Ross, David Frederick, Frederick S. Weston, and W. Stephen. Introduction to supply chain management technologies. CRC Press, 2010.
Rysavy, "Mobile-commerce ASPs do the legwork," Network Computing, Jan. 22, 2001, p. 71, 6 pgs., vol. 12, No. 2.
Saunders, "AdFlight to Offer WAP Ads," Oct. 17, 2000, printed from clickz.com/487531/print.
Schaffer, Neil, The Top 20 Twitter clients—HootSuite, TweetDeck and More, Jan. 31, 2012, https://maximizesocialbusinss.com/top-20-twitter-clients-2012-9175/ (Year: 2012).
Schmid, "Electronic Markets," Electronic Markets—The International Journal, Oct. 1993, 2 pages, vol. 3, No. 3.
Schwankert, "Matsushita Taps 2Roam for Wireless Solutions," www.internetnews.com/bus-news.article.php/674811, Feb. 2, 2001.
Sen, "Inventory and Pricing Models for Perishable Products," Doctor of Philosophy Dissertation—University of Southern California, Aug. 2000.
Siegmann, "Nowhere to go but up," PC Week, Oct. 23, 1995, 3 pages, vol. 12, No. 42.
Telephony Staff, "Air-ASP," Telephony Online, Oct. 2, 2000, 3 pages.
2Roam, Inc., multiple archived pages of www.2roam.com retrieved via Internet Archive Wayback Machine on Jun. 10, 2008.
Alt et al., "Bibliography on Electronic Commerce," Electronic Markets—The International Journal, Oct. 1993, 5 pages, vol. 3, No. 3.
Alt et al., "Computer Integrated Logistics," Electronic Markets—The International Journal, Oct. 1993, 1 page, vol. 1, No. 3.
Anonymous, Image manipulation (image-editing software and image-manipulation systems)(Seybold Special Report, Part II), Seybold Report on Publishing Systems, May 15, 1995, pS35(9), vol. 24, No. 18.
auctionwatch.com, multiple pages—including search results for "expedition," printed Apr. 21, 2011.
auctiva.com, multiple pages, undated but website copyright date is "1999-2000."
Ball et al., "Supply chain infrastructures: system integration and information sharing," ACM SIGMOD Record, 2002, vol. 31, No. 1, pp. 61-66.
Berger et al., "Random Ultiple-Access Communication and Group Testing," IEEE, 1984.
Braganza, "Is Resarch at Cranfield—A Look at the Future," Electronic Markets—The International Journal, Oct. 1993, 1 page, vol. 3, No. 3.
Brecht et al., "The IM 2000 Research Programme," Electronic Markets—The International Journal, Oct. 1993, 1 page, vol. 3, No. 3.
Business Wire business/technology editors, "Sellers Flock to OutletZoo.com as New Automatic Price Drop Method Moves Excess Inventory Online," Business Wire, Oct. 25, 1999.
Business Wire business editors/high-tech writers, "PictureWorks Technology, Inc. Expands in Real Estate Market with Adoption of Rimfire on REALTOR.com," Business Wire, Nov. 8, 1999.
Business Wire business editors/high-tech writers, "PictureWorks Technology, Inc. Shows Strong Revenue Growth in Internet Imaging Business," Business Wire, Nov. 10, 1999.
Business Wire business editors/high-tech writers, "2Roam Partners with Pumatech to Delivery Wireless Alerts," Business Wire, Dec. 18, 2000.
Business Wire business editors/high-tech writers, "2Roam Takes eHow's How-to Solutions Wireless: With 2Roam, the Web's One-Stop Source for getting Things Done is on More Wireless Devices, with Ability to Purchase Its Products from Anywhere," Business Wire, Oct. 2, 2000.
Business Wire business editors/high-tech writers, "2Roam Drives Hertz to the Wireless Web: Number One Car Rental Company to Provide Customers Wireless Access from Any Device," Business Wire, Aug. 7, 2001.
buy.com, www.buy.com homepage, printed Oct. 13, 2004.
Chen et al., "Detecting Web Page Structure for Adaptive Viewing on Small Form Factor Devices," ACM, May 20-24, 2003.
Chen, M. (2007). Knowledge assisted data management and retrieval in multimedia database systems (Order No. 3268643).
Y.K. Choi and S. K. Kim, "An auxiliary reccomendation system for repetitively purchasing items in E-commerce," 2014 International Conference on Big Data and Smart Computing (BIGCOMP), Bangkok, 2014, pp. 96-98. (Year 2014).
Clarke, "Research Programme in Supra-organizational Systems," Electronic Markets—The International Journal, Oct. 1993, 2 pages, vol. 3, No. 3.
Clemons et al., "Evaluating the prospects for alternative electronic securities markets," Proceedings of the twelfth international conference on information systems, New York, New York, United States, pp. 53-64, 1991.
Fan, J., Keim, F.A., Gao, Y., Luo, H. and Li, Z. (2009). JustClick: Personalized Image Recommendation via Exploratory Search from Large-Scale Flickr Images. Feb. 2009. IEEE Transactions on Circuits and Systems for Video Technology, 19(2), pp. 2730288. (Year: 2009).
friendster.com, homepage and "more info" pages, printed Apr. 29, 2004.
Google News archive search for "2Roam marketing" performed over the date range 2000-2003.
Google News archive search for "2Roam SMS" performed over the date range 2000-2008.
Grabowski et al., "Mobile-enabled grid middleware and/or grid gateways," GridLab—A Grid Application Toolkit and Testbed, Work Package 12—Access for Mobile Users, Jun. 3, 2003.
Graham, "The Emergence of Linked Fish Markets in Europe," Electronic Markets—The International Journal, Jul. 1993, 4 pages, vol. 8, No. 2.
Gunthorpe et al., "Portfolio Composition and the Investment Horizon," Financial Analysts Journal, Jan.-Feb. 1994, pp. 51-56.
Halperin, "Toward a Process Handbook for Organizational Coordination Processes," Electronic Markets—The International Journal, Oct. 1993, 1 page, vol. 3, No. 3.
Hess et al., "Computerized Loan Origination Systems: An Industry Case Study of the Electronic Markets Hypothesis," MIS Quarterly, Sep. 1994, pp. 251-275.
IBM, "Anyonymous Delivery of Goods in Electronic Commerce," IBM Technical Disclosure Bulletin, Mar. 1996, pp. 363-366, vol. 39, No. 3.
IBM, "Personal Optimized Decision/Transaction Program," IBM Technical Disclosure Bulletin, Jan. 1995, pp. 83-84, vol. 38, No. 1.
Icrossing, "Icrossing Search Synergy: Natural & Paid Search Symbiosis," Mar. 2007.
IEEE 100—The Authoritative Dictionary of IEEE Standard Terms, Seventh Edition, 2000. Entire book cited; table of contents, source list, and terms beginning with A included. ISBN 0-7381-2601-2a.
Ives et al., "Editor's Comments—MISQ Central: Creating a New Intellectual Infrastructure," MIS Quarterly, Sep. 1994, p. xxxv.

(56) References Cited

OTHER PUBLICATIONS

Joshi, "Information visibility and its effect on supply chain dynamics," Ph.D. dissertation, Massachusetts Institute of Technology, 2000 (fig. 4.5; p. 45).
Klein, "Information Logistics," Electronic Markets—The International Journal, Oct. 1993, pp. 11-12, vol. 3, No. 3.
Klein, "Introduction to Electronic Auctions," Electronic Markets—The International Journal, Dec. 1997, 4 pages, vol. 7, No. 4.
Kubicek, "The Organization Gap," Electronic Markets—The International Journal, Oct. 1993, 1 page, vol. 3, No. 3.
S. Kulkarni, A. M. Sankpal, R.R. Mudholkar and Kirankumari, "Recommendation engine: Matching individual/group profiles for better shopping experience," 2013 15th International Conference on Advanced Computing Technologies (ICACT), Rajampet, 2013, pp. 1-6. (Year: 2013).
Kuula, "Telematic Services in Finland," Electronic Markets—The International Journal, Oct. 1993, 1 page, vol. 3, No. 3.
Lalonde, "The EDI World Institute: An International Approach," Electronic Markets—The International Journal, Oct. 1993, 1 page, vol. 3, No. 3.
Lee et al., "Intelligent Electronic Trading for Commodity Exchanges," Electronic Markets—The International Journal, Oct. 1993, 2 pages, vol. 3, No. 3.
Lee et al., "Electronic Brokerage and Electronic Auction: The Impact of IT on Market Structures," Proceedings of the 29th Annual Hawaii International Conference on System Sciences, 1996, pp. 397-406.

\* cited by examiner

SYSTEM AND METHOD FOR OPTIMIZING ELECTRONIC DOCUMENT LAYOUTS

CROSS REFERENCE TO RELATED APPLICATIONS

This document claims the benefit of U.S. Prov. Pat. App. No. 62/335,050 filed on May 11, 2016 and U.S. patent application Ser. No. 15/593,040 filed May 11, 2017, the entireties of which are hereby incorporated by reference.

BACKGROUND OF THE INVENTION

Field of the invention: This invention relates to the general field of network delivered digital content, and more specifically toward a system and method that ranks and sorts mobile, web, and email content in real-time to increase customer engagement, click-through rate (CTR), and/or conversions. A client applies attributes to sections of the digital content. A server system tracks end user inputs and generates optimized layouts for the digital content, such as a webpage. The document layout is ordered or reorganized before or after the document is delivered to the end user.

Just as brick and mortar stores optimize their shelf space and floor-sets to increase conversions and order size, the digital world can also optimize the real estate of their websites, apps, emails, or virtual reality (VR) environment to maximize engagement, CTR, conversions, and revenue. Today, mobile, web, and email optimization are primarily done through data analysis, and AB or multivariate testing. The problem is that these optimizations are manual, non-scalable, and prone to errors.

Manual A/B testing or analytics is how web content optimization has occurred in the past. Analytics, A/B testing, and recommendation platforms can aid developers in optimizing page layout; however, none of these automate the optimization of the user interface. Furthermore, none of these enable real-time layout optimization based upon end-user behavior characteristics.

Thus there has existed a need for a system and method that ranks and sorts mobile, web, and email content in real-time to increase customer engagement, CTR, and/or conversions. Additionally, there is a need for a system that ranks and sorts content in virtual reality platforms, where the layout of a virtual environment can be optimized based on what a user views and interacts with.

SUMMARY OF THE INVENTION

The current disclosure provides just such a solution by having a system that automates the optimization of user interfaces. It restructures the user interface to present the most relevant information. The system can present a unique layout for all users (default), specific segments (cluster) of users, or for a specific user, based on the amount of data available.

Clients integrate their website with this system by adding tracking code to their system. This code tracks the impressions, positions, pixels, clicks, orders, revenue, and even virtual touch or handling of the users of the client's system (website, app, emails, or virtual reality environment). The system then uses randomized testing to rank the positions of content sections and/or subsections, while also ranking and scoring the actual page content. Then, the system places the best content in the best position, and the next best content in the next best position, and so on for the remaining content sections. Machine learning is used to determine the ideal weight of the various metrics used in the score, to maximize the client's key performance indicator (KPI). The KPI may be engagement, conversions, revenue, application signups, email signups, or other performance indicators based on the client's specific needs or specific application of the system.

A time decay function is also used to weigh more recent data more heavily than older data. The current system then uses the content score to sort the content modules (sections) in order, from best performing position to lowest performing position. Within these content sections, the system will also sort subsections of content in the same manner. The sort happens in real-time, and content can be dynamically resized to occupy a smaller or larger modules. The system can also remove content (i.e. sections or subsections) that are not performing well. This could be the result of the content performing below a required threshold (e.g. low conversion or CTR).

In addition, this technology can develop a unique sort for different segments (groups or cohorts) of users. These segments can be passed by the client, or identified by the system itself. In other words, users may experience a unique version of the page, app, email, or VR environment for different geolocations, whether they are new or repeat users, referring URL, or time of day, if it improves the KPI (e.g. CTR, conversion, revenue/impression) being optimized. The segments used can be determined by artificial intelligence (AI) or machine learning (ML) algorithms, and can vary based on the client or the application of the technology.

When data permits, the content sort can also be user specific. In other words, when the system described herein has sufficient data to recommend an optimization to a specific user, it does so. When there is insufficient data, it provides an optimization based upon other criteria or data, such as aggregated data (user segment or default).

Finally, clients of the system select what content modules, or objects, of their page, app, email, or VR environment should be optimized. Furthermore, clients can choose to lock, or pin, content (objects) that they would like to remain static.

It is an object of the invention to provide a system and method for optimizing the placement of content on a webpage, and whether or not to serve that content.

It is another object of the invention to provide a system and method for optimizing webpage content based upon client selected criteria.

It is a further object of this invention to provide a system and method for sorting subsections within a section that is itself sorted on a webpage.

Particular embodiments of the current disclosure have a system for optimizing the layout of an electronic document comprising a database and a processor executing programming logic for interfacing with remote systems, the programming logic configured to provide a content sort service, a track service, and a machine learning process; where the track service accepts end user request data, where the track service stores the end user request data in the database, and where the track service provides the end user request data to the machine learning process; where the machine learning process uses the end user request data to generate and update models, where the models are stored in the database; where the content sort service accepts optimization requests for an electronic document, where the electronic document comprises a plurality of sections, where the content sort service accesses the database to obtain models for the optimization request, where the content sort service selects one or more models from the models obtained from the database; where the content sort service applies the one or more selected models to generate an optimized order for the plurality of sections for the electronic document. The one or more models selected by the content sort service is a randomized model, where the randomized model is used to provide a partial or fully randomized optimized order for the plurality of sections for the electronic document. The content sort service further provides a response to an end user, where the response comprises the optimized order for the plurality of sections for the electronic document. Alternatively, the content sort service further provides a response to a client server, where the response comprises the optimized order for the plurality of sections for the electronic document. Each optimization request for an electronic document comprises data indicating that one or more of the plurality of sections of the electronic document are pinned. The pinned one or more of the plurality of sections of the electronic document are ignored by the content sort service. Each optimization request for an electronic document comprises a key performance indicator, where the content sort service uses the key performance indicator to select the one or more models obtained from the database. The content sort service uses a progressively localized content position randomization to generate an optimized order for the plurality of sections for the electronic document. The track service provides the end user request data to the machine learning process via one or more log files or via a distributed messaging system. At least one of the plurality of sections of the electronic document comprises a plurality of subsections, where the content sort service further applies the one or more selected models to generate an optimized order for the plurality of subsections.

Another embodiment of the current disclosure is a method of optimizing the layout of an electronic document, comprising the steps of: selecting a plurality of sections of the electronic document for optimization; selecting one or more criteria for optimizing the order of the plurality of sections of the electronic document; sending a request to a server system to optimize the plurality of sections of the electronic document using the one or more criteria; and upon receiving an optimization response from the server system, rearranging the sections of the electronic document according to the optimization response received from the server system. The method further comprises the step of resizing the sections of the electronic document. The method further comprises the step of removing one or more sections from the electronic document if it fails to meet predefined minimum criteria. At least one of the plurality of sections of the electronic document comprises a plurality of subsections, where the method further comprises the step of sending a request to a server system to optimize the plurality of subsections of the electronic document using the one or more criteria; and upon receiving a subsection optimization response from the server system, rearranging the subsections according to the subsection optimization response received from the server system. The method further comprises the step of adding one or more attributes to one or more of the plurality of sections of the electronic document.

Further embodiments of the current disclosure have a system for optimizing the layout of an electronic document comprising a processor executing programming logic for interfacing with remote systems, the programming logic configured to: accept a request for an electronic document from an end user system, send an optimization request to a server system for an optimized layout of the electronic document, where the electronic document comprises a plurality of sections; receive an optimized layout response from the server system, rearrange the sections of the electronic document according to the optimized layout response from the server system; and send an electronic document response to the end user system, where the sections of the electronic document are rearranged. The optimization request comprises a key performance indicator. At least one of the sections of the electronic document comprises a plurality of subsections, where the programming logic is further configured to rearrange the subsections according to the optimized layout response from the server system. The electronic document response sent to the end user system comprises computer readable instructions, where the computer readable instructions comprise instructions to send input data generated by the end user to the server system.

As used herein, a client is an entity that provides webpage, app, email, VR, or other electronic document content to end users and sets the criteria on the server system that generates the optimized webpage, app, email, VR, or other electronic document content order or layout. An end user, or simply user, is the entity that is requesting and viewing the electronic document content of a client. The webpage layout is optimized for the end user. The electronic document, which includes without limitation webpage, app, email, and VR content, has two or more sections and/or subsections that can be reorganized or optimized.

While particular programming languages, file structures, databases, and operating systems may be discussed herein, other languages, file structures, databases, and operating systems may be implemented without departing from the scope of the current disclosure.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. Additionally, the various embodiments set forth herein are described in terms of exemplary block diagrams, flowcharts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

There has thus been outlined, rather broadly, the more important features of the invention in order that the detailed description thereof may be better understood, and in order that the present contribution to the art may be better appreciated. There are additional features of the invention that will be described hereinafter and which will form the subject matter of the claims appended hereto. The features listed herein and other features, aspects and advantages of the present invention will become better understood with reference to the following description and appended claims.

BRIEF DESCRIPTION OF THE FIGURES

The accompanying drawings, which are incorporated in and form a part of this specification, illustrate embodiments of the invention and together with the description, serve to explain the principles of this invention.

DETAILED DESCRIPTION OF THE INVENTION

Figure 1:
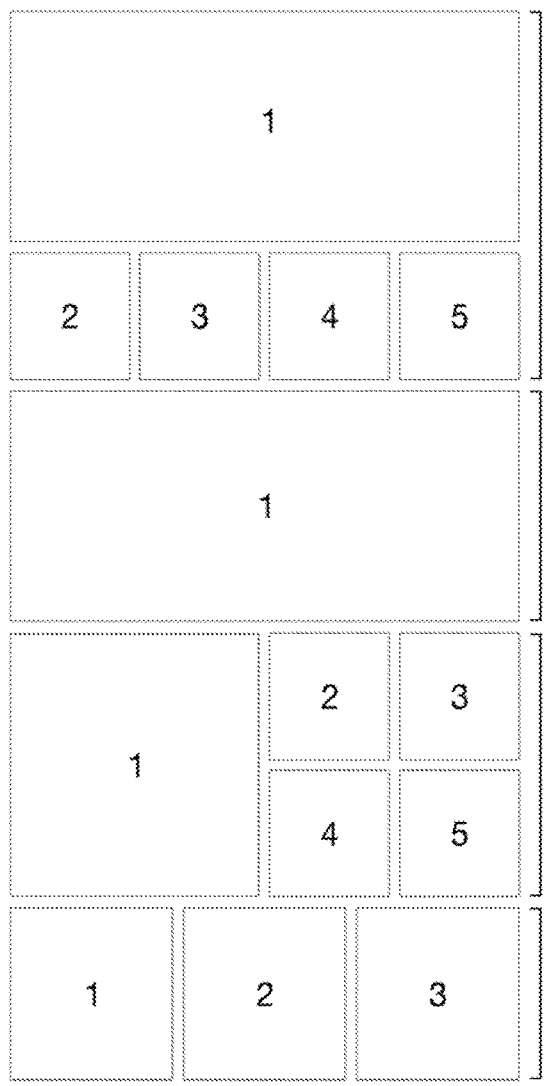
FIG. 1 is diagram showing an original page layout according to selected embodiments of the current disclosure.

Many aspects of the invention can be better understood with the references made to the drawings below. The components in the drawings are not necessarily drawn to scale. Instead, emphasis is placed upon clearly illustrating the components of the present invention. Moreover, like reference numerals designate corresponding parts through the several views in the drawings.

FIG. 1 is diagram showing an original page layout according to selected embodiments of the current disclosure. The page includes a header and a footer, with four sections there between labeled A, B, C, and D. Each section may have 1 or more subsections therein. For example, section A has subsections 1, 2, 3, 4, and 5; section B has just one subsection, section C has subsections 1, 2, 3, 4, and 5, and section D has subsections 1, 2, and 3. Each section may have a different layout, such that the subsections are arranged differently compared to other sections.

Figure 2:
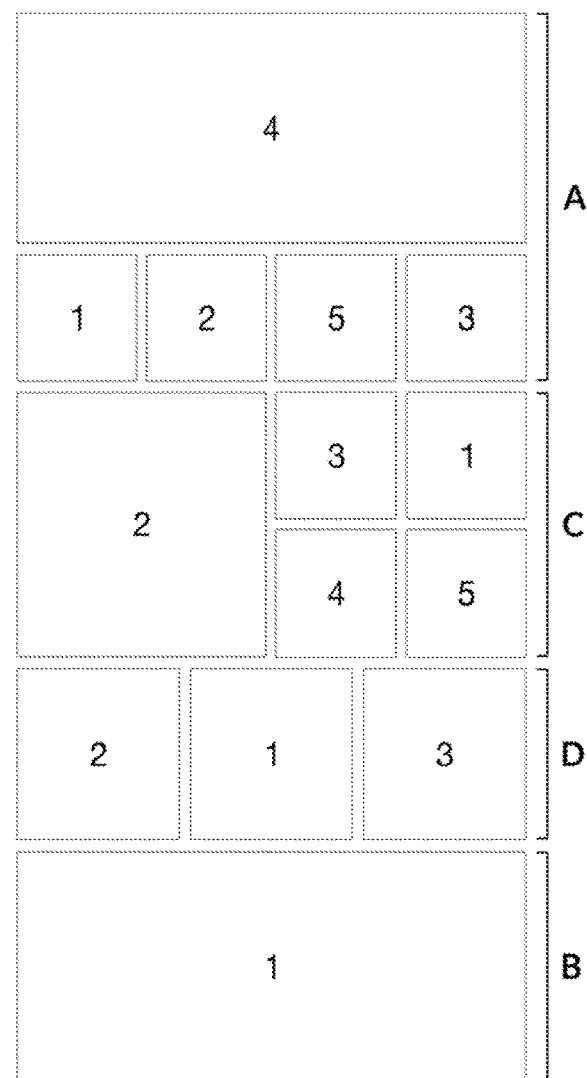
FIG. 2 is a diagram showing an optimized page layout according to selected embodiments of the current disclosure.

FIG. 2 is a diagram showing an optimized page layout according to selected embodiments of the current disclosure. As with the original page layout, the optimized page layout includes a header at the top and a footer at the bottom. However, the placement of the sections has been modified to optimize the layout. While section A remains at the top of the page, it is now followed by section C. Section D follows section C, with the last Section B placed at the bottom.

Furthermore, the subsections within each section have been optimized as well. For example, section A previously had a larger subsection 1, with subsections 2 through 5 beneath it. Now, however, section A has a larger subsection 4, with subsections 1, 2, 5, and 3 beneath it. In fact, each section, subsection, or both may be resized to fit within the available content area. As shown in FIGS. 1, and 2, subsections 1 and 2 are resized to fit the allocated space.

Figure 3:
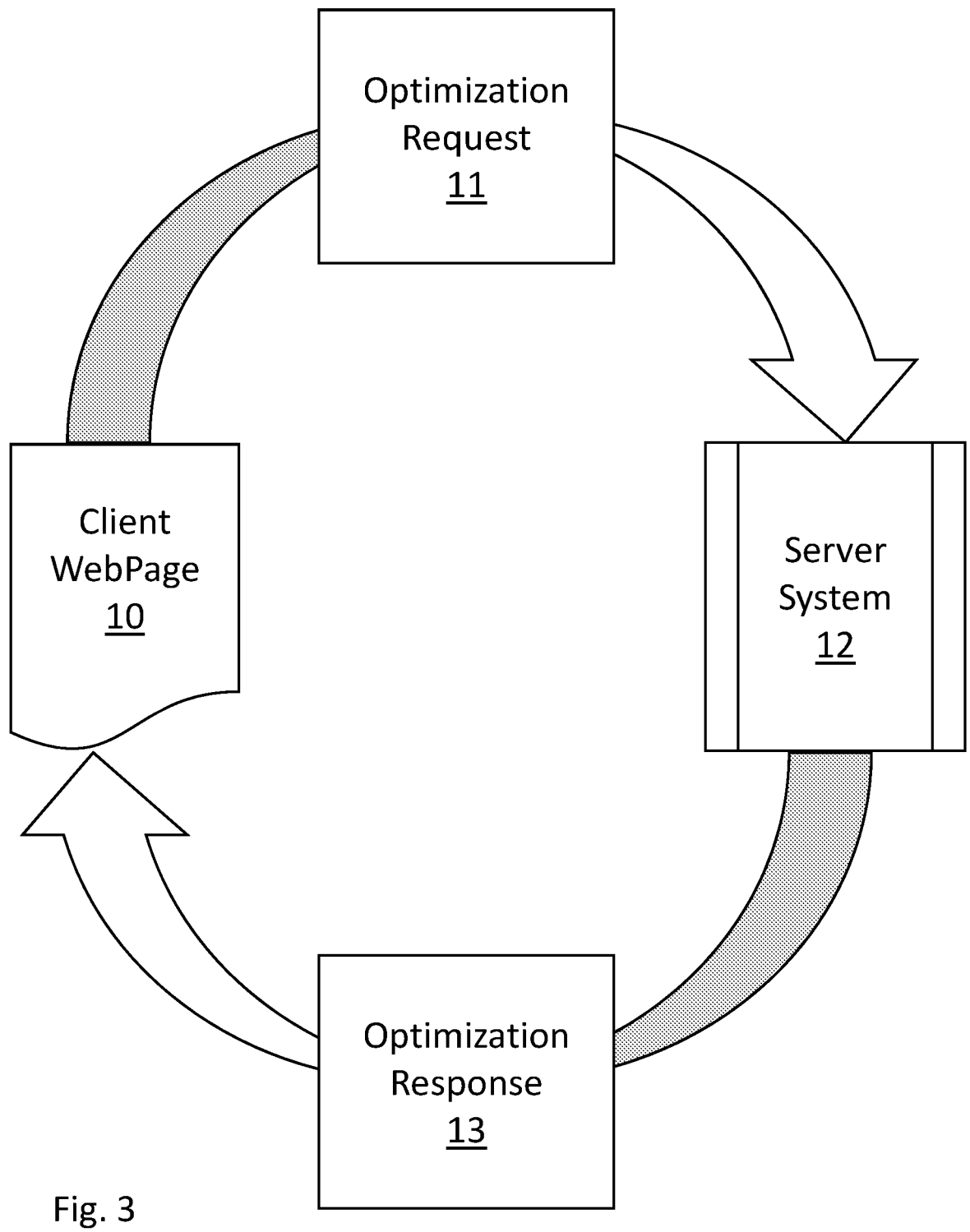
FIG. 3 is a flowchart showing the interaction between the client webpage and the server system according to selected embodiments of the current disclosure.

FIG. 3 is a flowchart showing the interaction between the client webpage and the server system according to selected embodiments of the current disclosure. The client webpage 10 sends an optimization request 11 to a server system 12. The server system 12 processes that request, and returns an optimization response 13 to the client webpage to act upon. The client webpage uses the optimization response to optimize the webpage layout.

Figure 4:
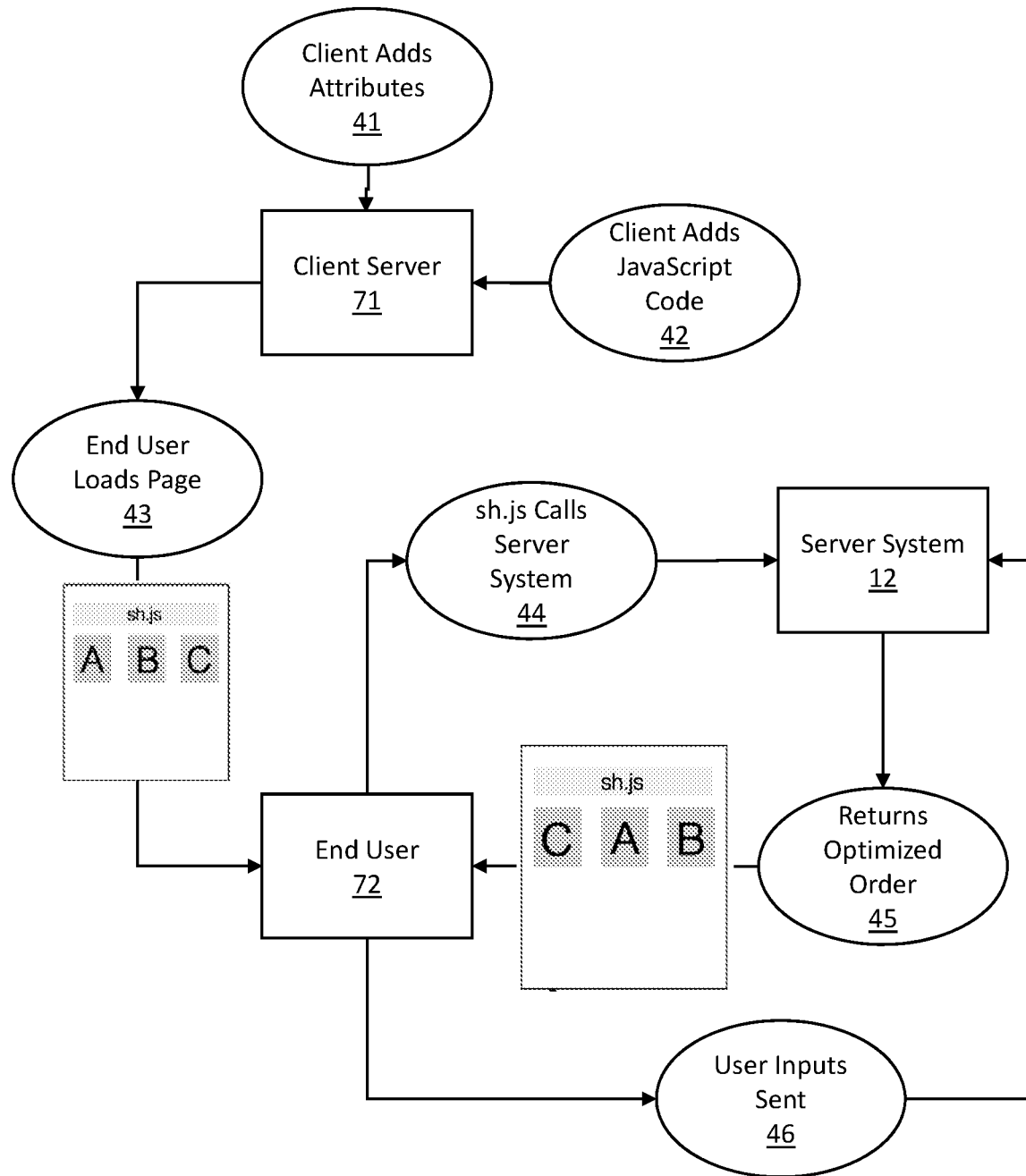
FIG. 4 is a flowchart showing a process for providing an optimized webpage layout using a client-side integration according to selected embodiments of the current disclosure.

FIG. 4 is a flowchart showing a process for providing an optimized webpage layout using a client-side integration according to selected embodiments of the current disclosure. Attributes are added 41 by the client to the client's webpage on the client's server 71. These attributes apply to particular sections or subsections of a webpage that the client wants optimized by the server system 12. Additionally, the client adds JavaScript code 42, or alternatively, a reference to download a JavaScript file that includes the JavaScript code. The JavaScript code includes computer readable instructions for interacting with the server system (such as tracking user behavior) and optimizing the content of the webpage. An end user 72 (or the end user's system or browser) then loads the client's webpage 43.

After loading the page, including the instructions contained in the JavaScript code or file, the instructions are executed and a request is made 44 to the server system 12 to obtain an optimized layout or order for the webpage downloaded by the end user 72. The server system 12 generates such an optimized order or layout, and returns a response with the optimized order 45 back to the end user 72. The instructions contained in the JavaScript code then optimize the webpage order or layout based upon the data received from the server system 12. The sections and subsections of the webpage are reorganized and moved around to optimize the content based upon the attributes set by the client. End user inputs, including without limitation impressions, clicks, and orders, are sent 46 to the server system 12. This input data is used to generate future optimized content for that particular end user, as well as other end users.

Figure 5:
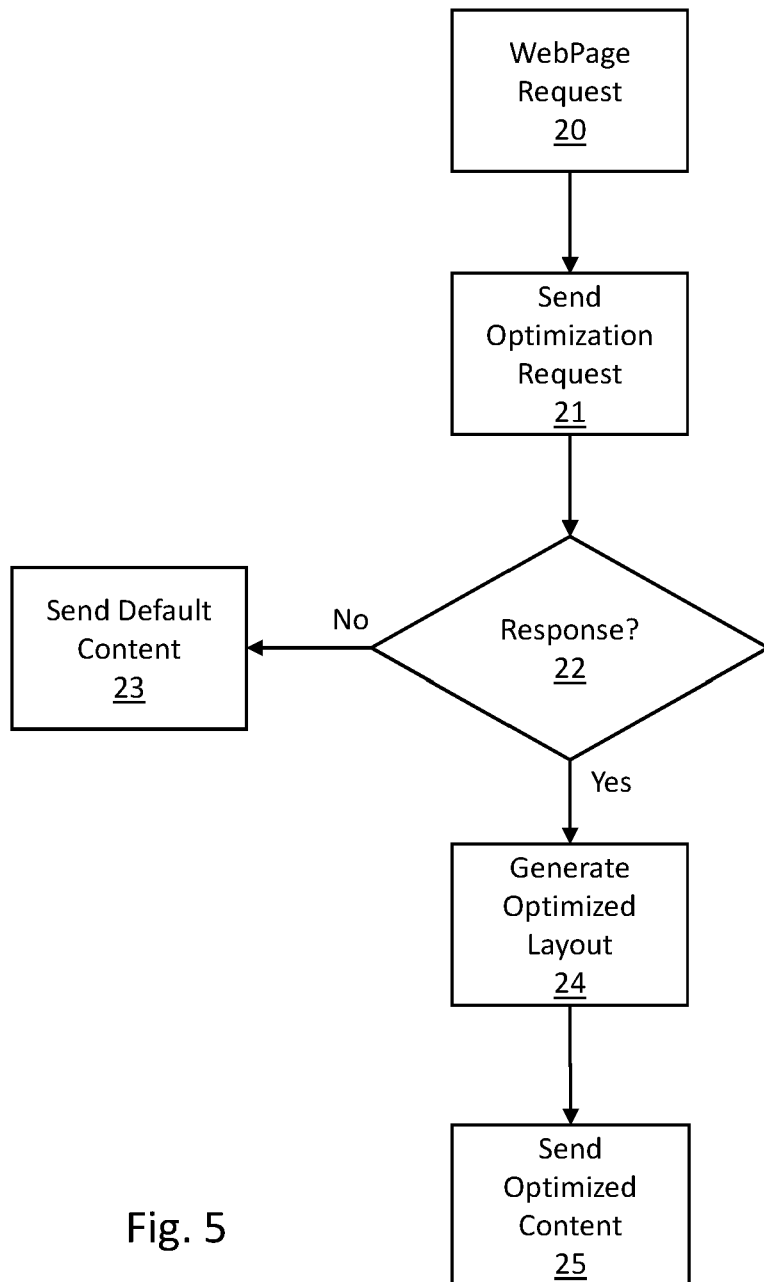
FIG. 5 is a flowchart showing an alternative process for providing an optimized webpage layout according to selected embodiments of the current disclosure.

FIG. 5 is a flowchart showing a process for providing an optimized webpage layout according to selected embodiments of the current disclosure. An end user makes a request to view a particular webpage, and that webpage request 20 is processed by a client server. The client server sends an optimization request 21 to the server system, which processes and generates optimization responses, discussed in more detail below. If the client server does not receive a response 22, or the response 22 is invalid, the client server sends default content 23 to the end user. If, on the other hand, the client server receives a valid response 22, it generates an optimized layout 24 using the response from the server system. For example, the client server will use the data in the response to organize a webpage from its original format, such as the one shown in FIG. 1, to produce the layout in an optimized format, such as the one shown in FIG. 2. The optimized content is then sent 25 to the end user.

Figure 6:
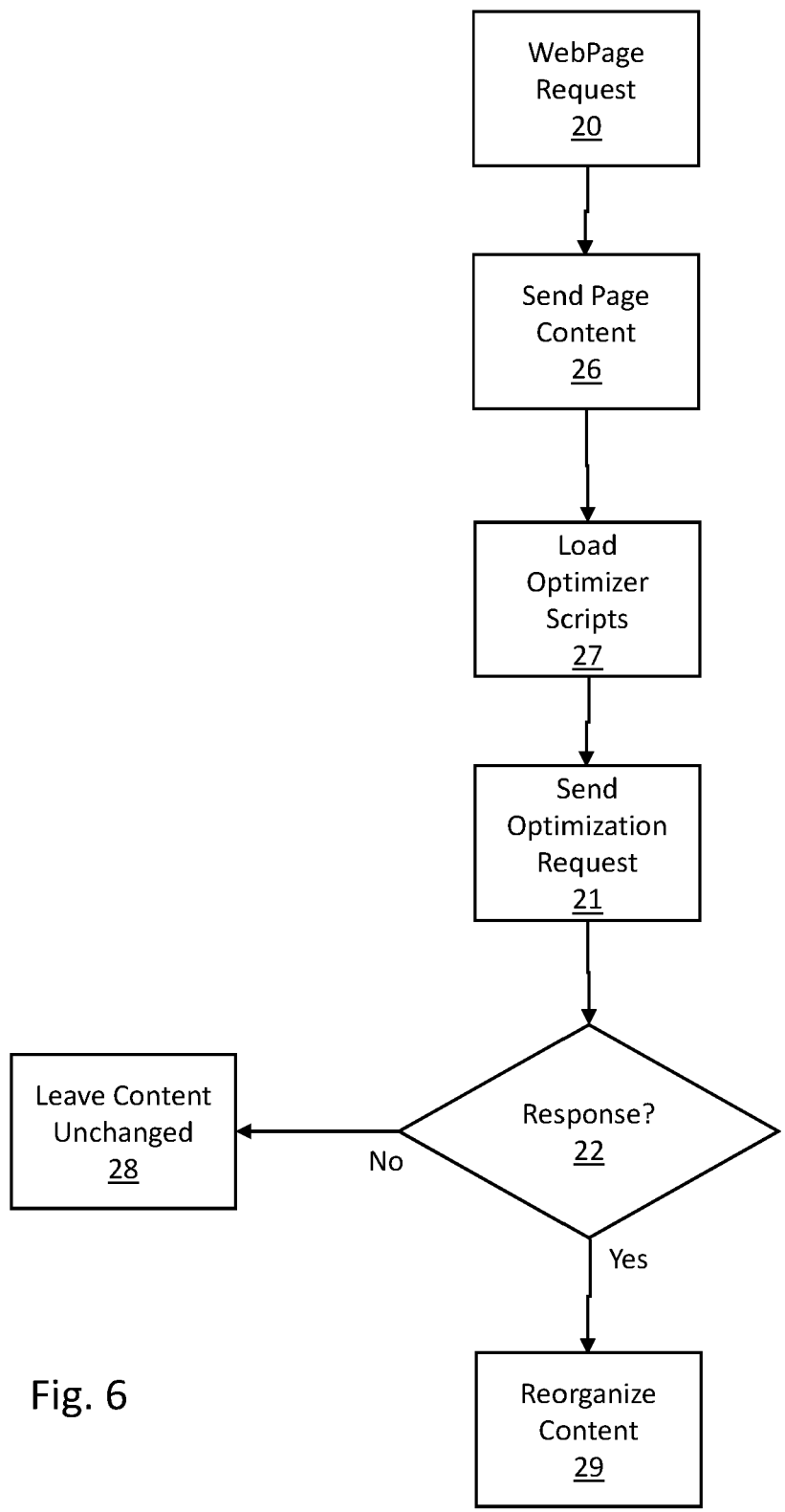
FIG. 6 is a flowchart showing another alternative process for providing an optimized webpage layout according to selected embodiments of the current disclosure.

FIG. 6 is a flowchart showing an alternative process for providing an optimized webpage layout according to selected embodiments of the current disclosure. As in FIG.

5, an end user makes a request to view a particular webpage, and that webpage request 20 is processed by a client server. However, in this figure, the client server sends the page content 26 to the end user, which includes a reference to one or more scripts used to access and interact with the server system. The end user, or more specifically, the browser of the end user, loads the optimizer scripts 27 and then sends an optimization request 21 to the server system. If no response 22 is received from the server system, or an invalid response 22 is received from the server system, the page content originally received by the end user is left unchanged 28. If, on the other hand, a valid response 22 is received from the server system, the content received from the client server is reorganized 29 by the optimizer scripts to produce an optimized layout for the end user.

Figure 7:
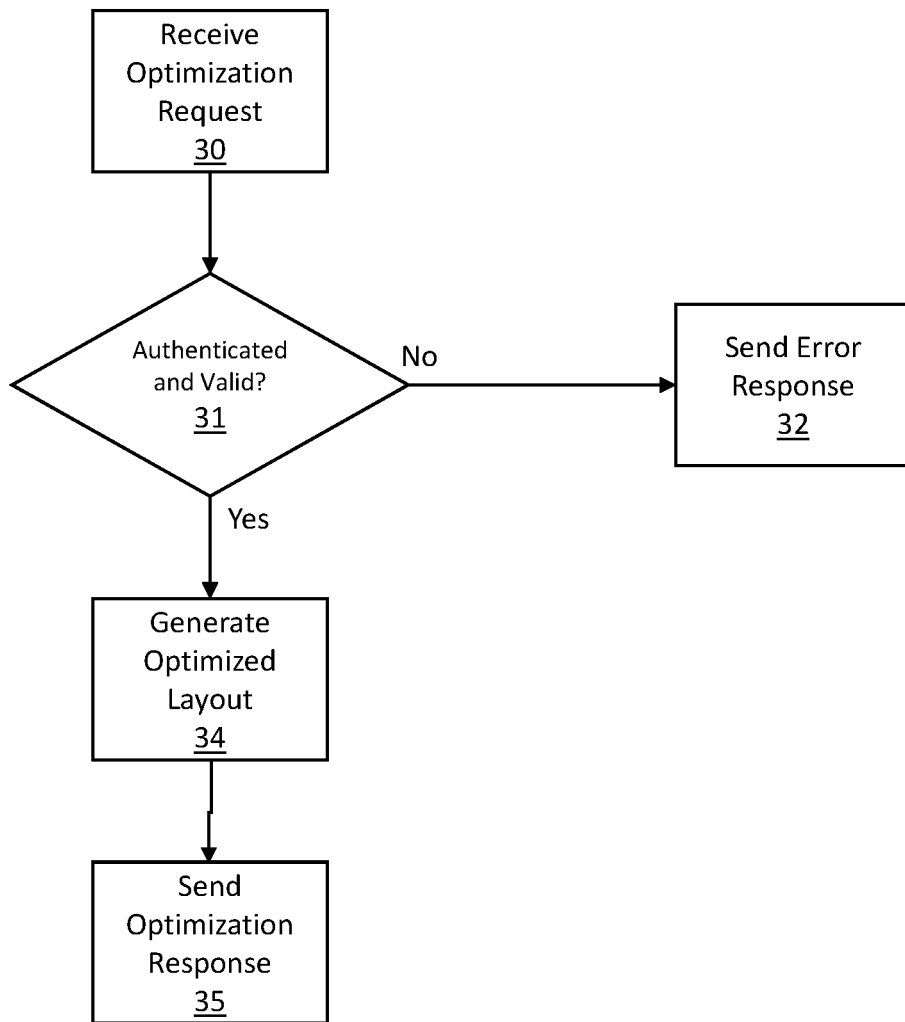
FIG. 7 is a flowchart showing a process executed on a server system for handling optimization requests from remote clients.

FIG. 7 is a flowchart showing a process executed on a server system for handling optimization requests from remote clients. The server system receives an optimization request 30, and then determines whether the request is authentic 31. In other words, it determines if the request is made from a webpage with a valid account that has been configured properly. If the server system determines that the request is not authentic or not valid 31, then the server system sends an error response 32. If, on the other hand, the server system determines that the request is authentic and valid 31, then the server system proceeds in generating an optimized sort order for an optimized layout 34. It then sends the optimized sort order response 35 back to the requestor.

Figure 8:
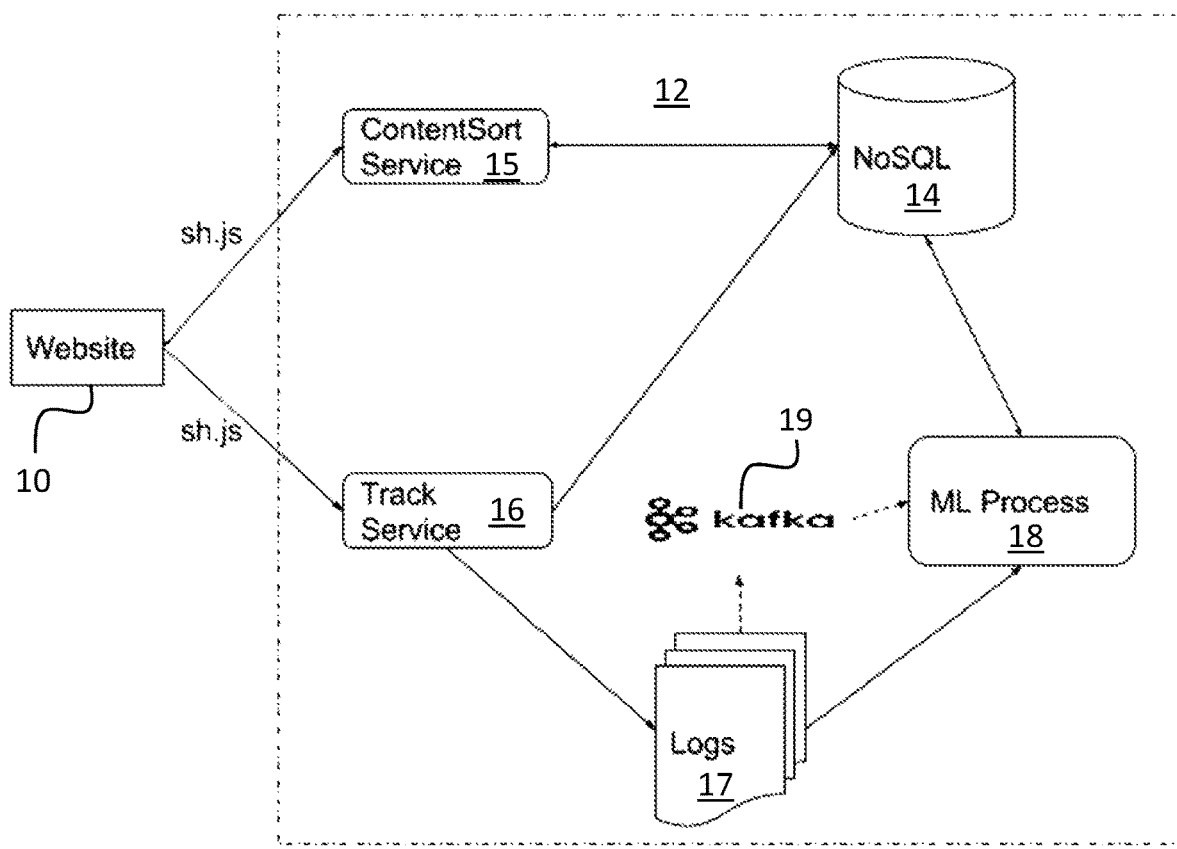
FIG. 8 is diagram showing the interactions between the client website and the server system according to selected embodiments of the current disclosure.

FIG. 8 is diagram showing the interactions between the client website and the server system according to selected embodiments of the current disclosure. The client website 10 interacts with the server system 12, whether through the client server or the end user's machine, through at least two services: a content sort service 15, and a track service 16. The content sort service 52 is a runtime component that returns the optimized sort order of the sections and/or subsections of a requested webpage. The track service 16 is a web service that tracks specific events, such as impressions and clicks. It writes events to a log file 17 as well as to the database 14. The log files may be written to in JSON format, and the data stored in a NoSQL database. The database 14 stores tracking information and is used by the content sort service 15 to provide optimized orders of sections and/or subsections of webpages. A machine learning (ML) process 18 generates aggregate data based on the tracked events as well as generates models based on online learning algorithms, discussed in more detail below. The generated models are stored into the database 14.

The content sort process begins when a client webpage 10 sends a request to the content sort service 15 of the server system 12 for an optimized layout. The content sort service 15 accesses the database 14 to determine whether the webpage is configured correctly, including without limitation whether the client webpage is authorized to access this service and if so, what KPI have been set for this particular webpage or, alternatively, whether there is sufficient data to automatically determine which KPI(s) to use based upon the different weights assigned to each KPI by the client. Subsequently, the content sort service 15 accesses the database 14 to find all applicable models for this particular request given the KPI(s) that are to be used. Models describe the predicted performance of content at different sort positions, as well as the relative strength of different positions within the webpage. The content sort service 15 generates scores for each of these models and uses the scores to determine which models to use. For example, each applicable model is given a score relative to its perceived ability to generate the optimal layout for a particular webpage for the particular user given the KPI(s) that are set for that particular webpage. The model with the best score is used to determine the sort order for the sections and/or subsections of this webpage.

Embodiments of the current disclosure also provide for the content sort process to designate sections or subsections for removal. If a particular model determines that a certain section or subsection does not meet or exceed a predefined minimum score or criteria, that section or subsection is removed from the layout. The removed content may be replaced with other content, or is simply not displayed in the electronic document.

For each request to the content sort service 15, the request will be randomly assigned to return either a "learning" response or an "optimized" response. For requests that are assigned to return an optimized response, the optimized sort order data representing the optimized order of the sections and/or subsections is returned to the webpage. For requests that are assigned to return a learning response, the optimized sort order data is at least partially randomized to allow the machine learning process to more efficiently test and predict an optimal content sort order. The randomization process for learning requests uses a progressively localized content position randomization whereby new content is randomly ordered across a wide range of positions, and as impression volumes increase, the content is randomly ordered across a progressively narrower range of positions around the calculated optimal position. This is designed in a way so as to minimize the learning costs for the machine learning algorithm. The resulting randomized sort order data representing the order of sections and/or subsections is returned to the webpage.

The track service 16 takes end user request or input data, such as impressions and clicks, and saves it to the database 14 as well as to log file(s) 17.

The machine learning process 18 is run continuously, at set increments of time, or at variable increments of time. The machine learning process 18 looks at log files 17 to process new events (end user request data) as they come in or shortly thereafter. Instead of reading log files, the machine learning process 18 can access the end user request data events using a distributed messaging system/service 19, such as Apache Kafka. In either instances, the machine learning process 18 aggregates data based on event type, such as impressions, clicks, conversion, revenue, and a/b test. Models are generated and regenerated using online learning algorithms, discussed in more detail below. The machine learning process 18 may also evaluate multiple algorithms to determine which model is most likely to provide the best optimized layout. Furthermore, multiple models may be combined together using Ensemble Learning methodologies, such as bucket of models, to provide more accurate models. The models generated by the machine learning process 18 are saved to the database 14 for use by the content sort service 15.

Machine learning algorithms, such as sequential learning, are used to create models for predicting and generating an optimized order of sections and/or subsections of the webpage. The content sort service uses these models to generate the optimized order data in response to requests for an optimized webpage layout.

In sequential learning, the algorithm attempts to minimize the error between a predicted optimized layout and an actual optimized layout. The machine learning process receives input data, such as from the log file or distributed messaging system. It uses this input to make a prediction of the optimized layout, or in other words, creates a model that generates an optimized layout. The optimized layout is displayed to an end user. The end user interacts with the layout, and generates additional end user request data, which is then received by the machine learning process. The machine learning process evaluates the error in its optimized layout, and updates its model to provide an improved model to generate optimized layouts.

By way of example, the machine learning process receives input data from a webpage with three sections: A, B, and C. It generates a model and saves that model to the database. An end user visits the webpage, and the webpage requests an optimized layout. The content sort service is looking to optimize click through by the user, that is, the webpage should be optimized such that the user clicks on at least one of the sections to travel to another page. Using the model generated by the machine learning process, the content sort service determines that the optimal layout is section B followed by section C, which is then followed by section A. This order data is delivered to the webpage, which is reordered and displayed to the end user. An optimal page layout would have the user clicking on the first section, that is, section B. However, the end user does not click on section B or section C, but rather clicks on the last section A. Another end user that is displayed this same layout does not click on any of the sections. These events are sent to the track service, which distributes the data to the machine learning process through log files or a distributed messaging system/service. The machine learning process evaluates the event data and determines that the optimized layout that should have been sent to the end users was section A followed by section B, which should have been followed by section C. The machine learning process updates its model accordingly, and saves it to the database.

The client selects which layouts it would like optimized, and the criteria or KPI used to optimize those layouts. Instead of selecting a specific KPI, the client may set an order of KPI to be used, or even apply a preference or weight to each KPI. The content sort service will then use the preferences or weights of each KPI to determine which model to use to provide the optimized order to generate the optimized layout of the web page.

In addition to selecting which sections should be optimized, users may also "pin" or select certain sections that should remain static or stationary relative to other sections. This can be helpful when a client wishes a particular section to be first, last, or follow or precede another section.

When a section is pinned, this section can be completely ignored. The optimization request leaves out the section in its request to the content sort service, and the content sort service returns an optimized sort order for the sections without regard to the pinned section. For example, a header section that is always displayed first, or a footer section that is always displayed last, is considered "pinned" and can be ignored by the system. Alternatively, the pinned section may be included in the request to the content sort service, but with a flag or an attribute that signifies the particular section has been pinned, and how it has been pinned (for example, first, last, or relative to another section). This may be relevant data to the content sort service to determine the model and/or may be used as input to the model to determine the optimized sort order. For example, when a particular section is pinned first, that may modify the optimal order generated by the models for a particular end user.

Figure 9:
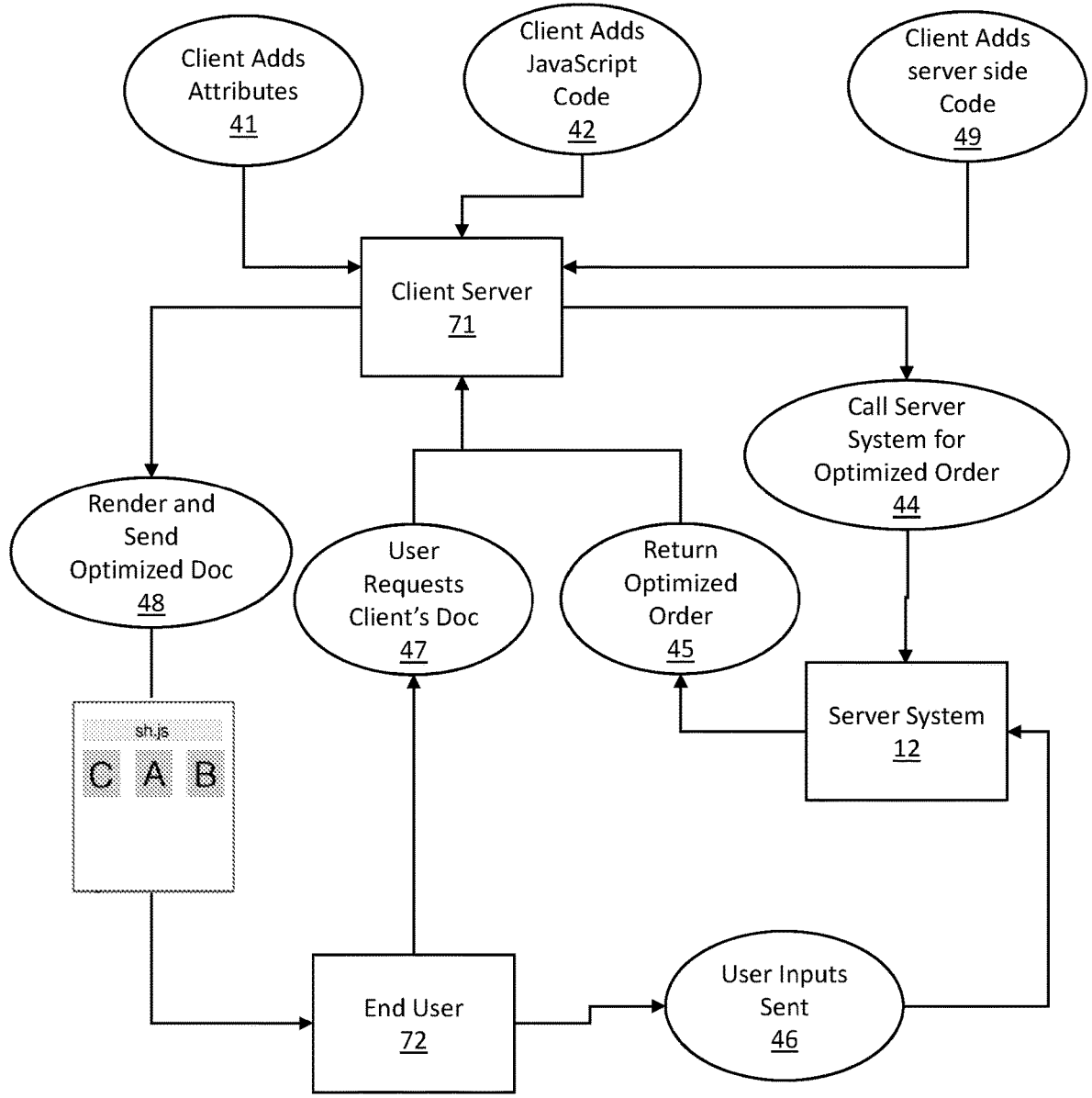
FIG. 9 is a flowchart showing a process for providing an optimized webpage layout using server-side processes according to selected embodiments of the current disclosure.

FIG. 9 is a flowchart showing a process for providing an optimized webpage layout using server-side processes according to selected embodiments of the current disclosure.

The client adds attributes 41 to the sections and subsections of the electronic document (e.g., website) residing on the client's server 71 that the client wants optimized. The client also adds a JavaScript code or file 42 to their website or electronic document distribution system. This file is used to track user behavior (e.g. clicks, impressions, conversions, etc.). Additionally, the client installs a server-side script or code 49 on the client's server(s) that is responsible for the optimization of the electronic document. The client's website and server are then ready to accept requests. A user requests the client's page. The client's server makes a request to the content sort service of the server system to get the optimized order for the electronic document 44. The content sort service of the server system generates (as discussed above) and then returns the requested optimized order data 45, and the client's server 71 (through the instructions provided for in the server-side script or code on the client's server(s)) compares the optimized order with the current electronic document and moves the necessary elements. The client server 71 renders the optimized electronic document with the newly ordered elements and provides the electronic document to the end user 48. Inputs generated by the user while interacting with the electronic document (e.g., impressions, clicks, orders, etc.) are sent 46 to the track service of the server system 12 (per the instructions provided for in the JavaScript file) such that the server system may calculate optimized sorts and ordering for subsequent requested electronic documents.

While various embodiments of the present invention have been described above, it should be understood that they have been presented by way of example only, and not of limitation. Likewise, the various diagrams may depict an example architectural or other configuration for the invention, which is provided to aid in understanding the features and functionality that can be included in the invention. The invention is not restricted to the illustrated example architectures or configurations, but the desired features can be implemented using a variety of alternative architectures and configurations.

Indeed, it will be apparent to one of skill in the art how alternative functional configurations can be implemented to implement the desired features of the present invention. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

That which is claimed:

1. A system for determining the optimal layout of digital content comprising a database and a processor executing programming logic for interfacing with remote systems, the programming logic configured to provide:
   a content sort service;
   an optimized response generator;

a learning response generator;
wherein the content sort service accepts an optimization request for the digital content where the digital content comprises a plurality of sections;
wherein the content sort service randomly assigns the optimization request to the optimized response generator or the learning response generator;
wherein the optimized response generator produces an optimized response using an optimized order for the digital content, wherein the content sort service stores the optimized order in the database;
wherein the learning response generator randomizes at least a portion of the optimized order stored in the content sort service to produce a learning response;
wherein the learning response or the optimized response are provided to an end user;
wherein a machine learning process tracks the use of the learning responses produced by the learning response generator and uses the data to improve the optimized order for the plurality of sections, and;
wherein the machine learning process uses a progressively narrowed range of content position randomization to improve the optimized order for the plurality of sections.

2. The system of claim 1 wherein the content sort service further provides a response to an end user, where the response comprises the optimized order for the plurality of sections of the digital content.

3. The system of claim 1, wherein the content sort service further provides a response to a client server, where the response comprises the optimized order for the plurality of sections for the digital content.

4. The system of claim 1, wherein the optimization request for digital content comprises data indicating that one or more of the plurality of sections of the digital content are pinned.

5. The system of claim 4, wherein the pinned sections of the digital content are ignored by the content sort service.

6. The system of claim 1, wherein the optimization request for digital content additionally comprises a key performance indicator, and wherein the machine learning process uses the key performance indicator to determine how to optimize the digital content.

7. The system of claim 1, further comprising a track service, where the track service stores end user request data in a database.

8. The system of claim 1, wherein at least one of the plurality of sections of the digital content comprises a plurality of subsections, where the content sort service further generates an optimized order for the plurality of subsections.

9. A method of optimizing the layout of digital content comprising the steps of:
accepting an optimization request for the digital content, wherein the digital content comprises a plurality of sections;
randomly assigning the optimization request to an optimized response generator or a learning response generator;
wherein the optimized response generator presents an optimized order for the plurality of sections, wherein an optimized order for the plurality of sections is stored in memory;
wherein the learning response generator takes the optimized order for the plurality of sections and randomly rearranges at least part of the optimized order to generate a learning response;
providing the learning response or the optimized response to an end user; and
tracking the use of the learning responses produced by the learning response generator and using a machine-learning system with the data to improve the optimized order for the plurality of sections;
wherein the machine learning system uses a progressively narrowed range of content position randomization to generate an optimized order for the plurality of sections of the digital content.

10. The method of claim 9, further comprising the step of resizing the sections of the digital content based on the optimized order for the plurality of sections.

11. The method of claim 9, further comprising the step of removing one or more sections of the digital content.

12. The method of claim 9, wherein at least one of the plurality of sections of the digital content comprises a plurality of subsections, where the method further comprises the step of generating an optimized order for the plurality of subsections.

13. The method of claim 9, further comprising the step of adding one or more attributes to one or more of the plurality of sections of the digital content.

14. The method of claim 9, wherein the optimization request comprises a key performance indicator.

15. A system for optimizing the layout of digital content comprising a database and a processor executing programming logic for interfacing with remote systems, the programming logic configured to provide: a content sort service and a machine learning process;
where the content sort service accepts an optimization request for the electronic document, where the digital content comprises a plurality of sections;
wherein the content sort service produces an optimized response using an optimized order for the plurality of sections of the digital content stored in the database;
wherein the content sort service randomizes at least a portion of the optimized response to produce a learning response; wherein the content sort service randomly determines whether to return an optimized response or a learning response in response to the optimization request;
where the machine learning process uses end user request data from a progressively narrowed range of content position randomization to generate an optimized order for the plurality of sections for the digital content.

16. The system of claim 15, wherein the content sort service further provides a response to an end user, where the response comprises the optimized order for the plurality of sections for the digital content.

17. The system of claim 15, wherein the content sort service further provides a response to a client server, where the response comprises the optimized order for the plurality of sections for the digital content.

18. The system of claim 15, wherein the optimization request for digital content comprises a key performance indicator, where the content sort service additionally uses the key performance indicator to determine how to optimize the order for the plurality of sections for the digital content.

* * * * *